US00RE40500E

(19) United States
(12) Reissued Patent
Doers et al.

(10) Patent Number: US RE40,500 E
(45) Date of Reissued Patent: Sep. 16, 2008

(54) INTERNAL COMBUSTION ENGINE

(75) Inventors: Douglas A. Doers, Franklin, WI (US); Dean P. Bergman, Waukegan, IL (US)

(73) Assignee: DeltaHawk Engines, Inc., Racine, WI (US)

(21) Appl. No.: 11/498,913

(22) Filed: Aug. 3, 2006

Related U.S. Patent Documents

Reissue of:
(64) Patent No.: 6,769,383
Issued: Aug. 3, 2004
Appl. No.: 10/350,748
Filed: Jan. 24, 2003

U.S. Applications:
(63) Continuation-in-part of application No. PCT/US01/20832, filed on Jun. 29, 2001.
(60) Provisional application No. 60/220,787, filed on Jul. 25, 2000.

(51) Int. Cl.
*F01P 3/02* (2006.01)

(52) U.S. Cl. ..... 123/41.82 R
(58) Field of Classification Search ..... 123/41.82 R, 123/41.28, 193.3, 193.5, 193.6; 92/187–191
See application file for complete search history.

(56) References Cited

U.S. PATENT DOCUMENTS

| | | | | | |
|---|---|---|---|---|---|
| 1,355,068 | A | | 10/1920 | Vincent | |
| 1,875,580 | A | | 9/1932 | Fisher | |
| 2,065,602 | A | | 12/1936 | Meyer | |
| 2,152,594 | A | * | 3/1939 | KLotsch | 123/41.28 |
| 2,387,114 | A | * | 10/1945 | Bonbright et al. | 123/80 DA |
| 2,397,114 | A | * | 3/1946 | Anzalone | 102/340 |
| 2,528,665 | A | * | 11/1950 | Peterson et al. | 220/327 |
| 2,855,911 | A | | 10/1958 | Christiansen | |
| 3,125,082 | A | * | 3/1964 | Stansfield et al. | 123/41.77 |
| 3,476,021 | A | * | 11/1969 | Williams | 92/187 |
| 3,612,012 | A | | 10/1971 | Dreisin | |
| 3,762,389 | A | | 10/1973 | Malina | |
| 3,765,384 | A | | 10/1973 | Barnard | |
| 3,942,487 | A | | 3/1976 | Zink | |
| 3,945,353 | A | | 3/1976 | Dreisin | |
| 4,066,057 | A | | 1/1978 | Hale | |
| 4,112,906 | A | | 9/1978 | Spencer | |
| 4,131,093 | A | | 12/1978 | Mansfield | |
| 4,237,847 | A | | 12/1980 | Baugh et al. | |
| 4,291,650 | A | | 9/1981 | Formia et al. | |
| 4,328,772 | A | | 5/1982 | Heydrich et al. | |
| 4,404,935 | A | | 9/1983 | Kraft | |
| 4,510,420 | A | * | 4/1985 | Sasso | 318/37 |
| 4,562,798 | A | | 1/1986 | van Os | |
| 4,635,596 | A | | 1/1987 | Nakano et al. | |
| 4,781,028 | A | * | 11/1988 | Zoche | 60/612 |
| 4,834,030 | A | | 5/1989 | Bauer et al. | |
| 4,953,525 | A | * | 9/1990 | Sakurai et al. | 123/41.28 |
| 4,957,085 | A | | 9/1990 | Sverdlin | |
| 5,044,339 | A | | 9/1991 | Udo Hafner | |
| 5,058,535 | A | | 10/1991 | Wilkinson | |
| 5,065,707 | A | | 11/1991 | Elsbett et al. | |
| 5,072,654 | A | | 12/1991 | MacGregor | |
| 5,094,217 | A | | 3/1992 | Kaku et al. | |
| 5,195,468 | A | | 3/1993 | Clark et al. | |

(Continued)

FOREIGN PATENT DOCUMENTS

| | | |
|---|---|---|
| WO | WO 02/08591 | 1/2002 |
| WO | WO 02/008591 A1 | 1/2002 |

*Primary Examiner*—Marguerite McMahon
(74) *Attorney, Agent, or Firm*—Michael Best & Friedrich LLP

(57) ABSTRACT

Improved internal combustion engine, particularly, an improved two-stroke, diesel aircraft engine. The invention includes a new wrist pin/connecting rod connection, a new cooling system for fuel injectors, a new cylinder head cooling arrangement, a new cooling jacket cross-feed arrangement, and a new combustion seal arrangement.

167 Claims, 10 Drawing Sheets

U.S. PATENT DOCUMENTS

| | | | | |
|---|---|---|---|---|
| 5,209,197 | A | | 5/1993 | Melchior |
| 5,279,268 | A | | 1/1994 | Brink et al. |
| 5,413,074 | A | | 5/1995 | Horiuchi |
| 5,427,067 | A | | 6/1995 | Horiuchi |
| RE35,079 | E | | 11/1995 | Sverdlin |
| 5,505,166 | A | | 4/1996 | Katoh |
| 5,529,027 | A | | 6/1996 | Okubo |
| 5,560,332 | A | | 10/1996 | Chang |
| 5,560,333 | A | | 10/1996 | Genouille |
| 5,577,472 | A | | 11/1996 | Banta, III et al. |
| 5,632,255 | A | | 5/1997 | Ferrenberg |
| 5,649,509 | A | | 7/1997 | Chang |
| 5,655,496 | A | | 8/1997 | Pong |
| 5,860,394 | A | | 1/1999 | Saito et al. |
| 5,878,703 | A | | 3/1999 | Sweeney |
| 5,924,407 | A | | 7/1999 | Iwaszkiewicz et al. |
| 5,975,032 | A | | 11/1999 | Iwata |
| 6,019,081 | A | | 2/2000 | Divecha et al. |
| 6,058,910 | A | | 5/2000 | Simmons et al. |
| 6,167,848 | B1 | | 1/2001 | Frantzheld |
| 6,199,520 | B1 | | 3/2001 | Warren |
| 6,427,642 | B1 | * | 8/2002 | Beer et al. ..... 123/41.82 R |
| 6,622,667 | B1 | * | 9/2003 | Doers ..... 123/41.31 |
| 6,681,727 | B2 | * | 1/2004 | Krenn ..... 123/41.82 R |
| 6,682,380 | B1 | * | 1/2004 | Irwin et al. ..... 440/88 C |
| 6,769,383 | B2 | * | 8/2004 | Doers et al. ..... 123/41.82 R |
| 2005/0235946 | A1 | | 10/2005 | Doers et al. |

* cited by examiner

INTERNAL COMBUSTION ENGINE

Matter enclosed in heavy brackets [ ] appears in the original patent but forms no part of this reissue specification; matter printed in italics indicates the additions made by reissue.

CROSS-REFERENCE TO RELATED APPLICATIONS

This Application is a continuation-in-part of PCT Application No. PCT/US01/20832, filed Jun. 29, 2001, which claims priority to U.S. application Ser. No. 09/663,838, filed Sep. 15, 2000, and U.S. Application No. 60/220,787, filed Jul. 25, 2000. The entire contents of these applications are hereby incorporated by reference.

BACKGROUND OF THE INVENTION

The present invention relates generally to internal combustion engines. More particularly, the present invention relates to two-stroke, diesel aircraft engines.

Internal combustion engines generally include an engine block defining a cylinder which includes a reciprocally operating piston. A cylinder head is generally mounted to the engine block over the cylinder. As generally known, the overall operation, reliability and durability of internal combustion engines depends on a number of design characteristics. One such design characteristic involves the piston pin or wrist pin/connecting rod connection. Uneven wear, excessive deflection or other structural deformities of the wrist pin will adversely affect the performance of an engine. Another design characteristic involves providing adequate cooling for fuel injectors. Generally, fuel injectors are in close proximity to the high heat regions of the combustion chambers. Without proper cooling, a fuel injector can malfunction and, in some cases, completely fail. Another design characteristic involves sufficiently cooling the cylinder heads. Thermal failure or cracking of a cylinder head results in costly repairs to the engine. Yet another design characteristic involves providing coolant to cooling jackets in multiple cylinder engines having a plurality of cylinder banks. Inadequate flow or obstructed flow of the coolant through the cooling jacket can result in engine failure.

A heat conducting fireplate or deck is typically provided beneath the cylinder head, and a combustion chamber is defined between the piston and the fireplate. Many internal combustion engines utilize a plurality of head bolts to secure the cylinder head to the engine block so as to provide a clamping force that seals the cylinder head to the engine block to prevent the undesirable escape of by products created by combustion within the combustion chamber.

SUMMARY OF THE INVENTION

The present invention provides an internal combustion engine having many advantages over prior art engines. In particular, the present invention provides certain improvements that are particularly well suited for use in two-stroke, diesel aircraft engines. The invention includes a new wrist pin/connecting rod connection, a new cooling system for fuel injectors, a new cylinder head cooling arrangement, a new cooling jacket cross-feed arrangement, and a new combustion seal arrangement.

The wrist pin, especially in two-stroke diesel engines, is nearly continuously under load. It is not uncommon for wrist pins to deflect under heavy or continuous loads. A heavy or thick walled wrist pin reduces the deflection, but at the cost of a substantial increase in weight. Thus, there is a need for a new wrist pin/connecting rod assembly which makes it less likely that the wrist pin will deflect under heavy or continuous loads, yet which does not appreciably add to the overall weight of the engine.

Providing a wrist pin/connecting rod assembly in which the wear on the bearing surface of the wrist pin is evenly distributed is difficult at best. Uneven wear of the wrist pin bearing surface can result in poor engine performance. Thus, there is a need for a wrist pin/connecting rod assembly which minimizes uneven wear on the wrist pin bearing surface.

Accordingly, the invention provides a connecting rod with a cradle-like upper end. In other words, the upper end of the connecting rod has an arcuate portion and does not encircle the wrist pin. The wrist pin has an outer surface in engagement with the arcuate portion of the connecting rod, and a plurality of fasteners (e.g., screws) secure the wrist pin to the arcuate portion of the connecting rod by extending through the wall of the wrist pin and into an insert within the wrist pin. Because the arcuate portion of the connecting rod does not completely encircle the wrist pin, the entire "top" of the wrist pin (the side of the wrist pin farthest from the crankshaft and nearest the piston crown) can bear against the piston. In other words, a longitudinal portion of the wrist pin that does not engage the arcuate portion of the connecting rod can bear against the piston. This results in the load and the wear being more evenly distributed across substantially the entire longitudinal length of the wrist pin and, therefore, a lighter wrist pin than would otherwise be necessary can be used. Moreover, the wrist pin insert stiffens the wrist pin, also allowing the use of a thinner wrist pin. In addition, because the wrist pin cannot pivot relative to the connecting rod, the forced movement or rocking of the wrist pin as the connecting rod pivots during operation of the engine aids in oiling and minimizes uneven wear on the wrist pin bearing surface.

Fuel injectors are subject to intense thermal conditions because of their general proximity to the cylinder heads. One way to cool fuel injectors is to install the fuel injectors through cooling jackets which are adjacent the cylinder heads. The cooling jackets can cool both the cylinder heads and the fuel injectors. However, cooling jackets are not always sufficient to cool the fuel injectors. Moreover, in some engine designs, cooling jackets are not located in positions which allow them to be used to cool the fuel injectors. Thus, there is a need for a new fuel injector cooling system which enhances operation of or operates independent from a cooling jacket.

Fuel pumps generally deliver more fuel than the fuel injection system and engine can utilize at any given moment. As a result, the excess fuel is typically returned to a fuel supply tank for further use. Rather than returning the overflow fuel from the fuel pump directly to the fuel supply tank, the present invention utilizes the overflow fuel to cool the fuel injectors. Circulating the overflow or bypass fuel from the fuel pump through the fuel injectors for the purpose of cooling the fuel injectors makes use of an existing liquid flow not previously used to cool the fuel injectors. The overflow fuel flows into each fuel injector via a newly-provided inlet port and flows out through the known leak-off port. It is not uncommon for engine coolant in a cooling jacket to reach temperatures in excess of 240° F. The overflow fuel is significantly cooler than the engine coolant running through the cooling jacket, thereby providing an improved method of cooling the fuel injector to increase fuel injector life. In those engines which do not use a cooling jacket, the fuel injector cooling system of the present invention provides a new way of cooling the fuel injectors.

Accordingly, the invention also provides a fuel injection system having a fuel injector for injecting fuel into a combustion chamber. The fuel injector includes a fuel inlet port, a fuel outlet port and a fuel passage communicating between the fuel inlet port and the fuel outlet port. The fuel injector further includes a cooling fuel inlet port, a leak-off fuel outlet port and a cooling fuel passage communicating between the cooling fuel inlet port and leak-off fuel outlet port. The fuel injection system includes a bypass fuel line which communicates between a fuel pump and the cooling fuel inlet port of the fuel injector. Overflow fuel from the fuel pump flows through the bypass fuel line and through the fuel injector to cool the fuel injector. Using the excess fuel from the fuel pump to cool the fuel injector simplifies or supplants the cooling jacket.

A problem particularly prevalent with aircraft engines concerns ice build-up on the fuel filter due to cold outside temperatures. The overflow fuel which cools the fuel injectors is warmed as it flows through the fuel injectors. The warmed overflow fuel is recirculated through the fuel injection system to travel through the fuel filter so as to provide the additional benefit of resisting ice build-up on the fuel filter in cold weather.

Radiant and conductive heating of a cylinder head can raise the temperature of the cylinder head above its metallurgical and structural limits. Traditionally, cylinder heads are bolted or otherwise secured to the cylinder block or engine block with a suitable head gasket therebetween to effectively seal the cylinder heads and provide the cooling means for the cylinder head. According to a preferred embodiment of the present invention, the cylinder head threads into the engine block. Because of this, cooling passages normally provided between the engine block and the cylinder head cannot be utilized. Thus, there is a need for a cylinder head cooling arrangement which is not dependent on the location of the cylinder head with respect to the engine block, as is the case with prior engine designs.

Accordingly, in another aspect of the present invention, a cooling cap is mounted on the cylinder head. The cooling cap and the cylinder head combine to define a substantially annular cooling passageway. The cooling cap further includes inlet and outlet ports which communicate with the cooling passageway, so that cooling fluid can flow through the cooling passageway to cool the cylinder head. According to one aspect of the present invention, the inlet and outlet ports of the cooling cap communicate with the cooling passageway, so that the cooling fluid is caused to flow from the inlet port, substantially all the way around the cooling passageway, and then out the outlet port to provide enhanced cooling effectiveness. The cooling cap is adjustably positionable on the cylinder head, such that the inlet and outlet ports of the cooling cap can be properly aligned with ports in the engine block. In other words, the cooling cap is connectable to a cooling jacket in the engine block regardless of the position of the cylinder head with respect to the cylinder block or engine block. Because the cylinder head threads into the engine block, it is not known exactly where the cylinder head will be positioned in terms of the engine block. Thus, the adjustable cooling cap of the present invention is especially advantageous in an engine in which the cylinder head threads into the engine block.

Threading the cylinder head into the engine block according to the present invention provides the added benefit of eliminating the bolt and head gasket system of prior engines. This eliminates a possible point of failure, while at the same time reducing the number of parts to assemble the engine. According to one aspect of the present invention, the engine block includes female threads concentric with the cylinder and the cylinder head includes male threads which engage the female threads on the engine block. Because the traditional bolt and head gasket assembly can be eliminated, in order to provide a proper combustion seal, the present invention provides, according to one aspect thereof, a biasing spring between a cylinder head and a fireplate. The spring provides a downward force against the fireplate to offset an upward force created by combustion within the combustion chamber, thereby substantially ensuring that a proper cylinder head combustion seal is maintained.

In V-type engines, a cooling jacket and an associated thermostat are typically provided for each cylinder bank. A problem with such prior arrangements is that if one thermostat fails, there is no mechanism to allow cooling fluid to flow through the associated cooling jacket. Another problem with such prior designs is that the temperature gradient between the hot cylinder heads and the cooler lower crankcase can be significant, thereby adding undesirable stress to the engine block and other engine components. Thus, there is a need for a new system which provides redundancy of thermostat operation and thermal coupling between the cylinder heads and the lower portion of the engine.

Accordingly, the invention also provides a cross-feed cooling passageway in the engine block of a V-type engine. The cooling passageway extends between a first cooling jacket adjacent a first cylinder bank and a second cooling jacket adjacent a second cylinder bank. The first thermostat communicates with the first cooling jacket and a second thermostat communicates with the second cooling jacket. The cooling passageway provides cooling fluid flow between the cooling jackets. This is particularly advantageous in the event that one of the thermostats fails. The cross-feed passageway will allow the cooling fluid to continue to flow if one thermostat fails, so as to reduce the possibility of damage to the engine from over-heating. Another advantage of the cooling passageway is that it reduces the temperature gradient between the cylinder heads and the lower crankcase.

The present invention addresses the above mentioned problems and other problems. In addition, other features and advantages of the invention will become apparent to those skilled in the art upon review of the following detailed description, claims and drawings in which like numerals are used to designate like features.

BRIEF DESCRIPTION OF THE DRAWINGS

FIG. 7 is also an enlarged view of a portion of FIG. 2 illustrating in greater detail, among other things, the cylinder, the cylinder head, the fuel injector and the cooling cap.

Figure 1:
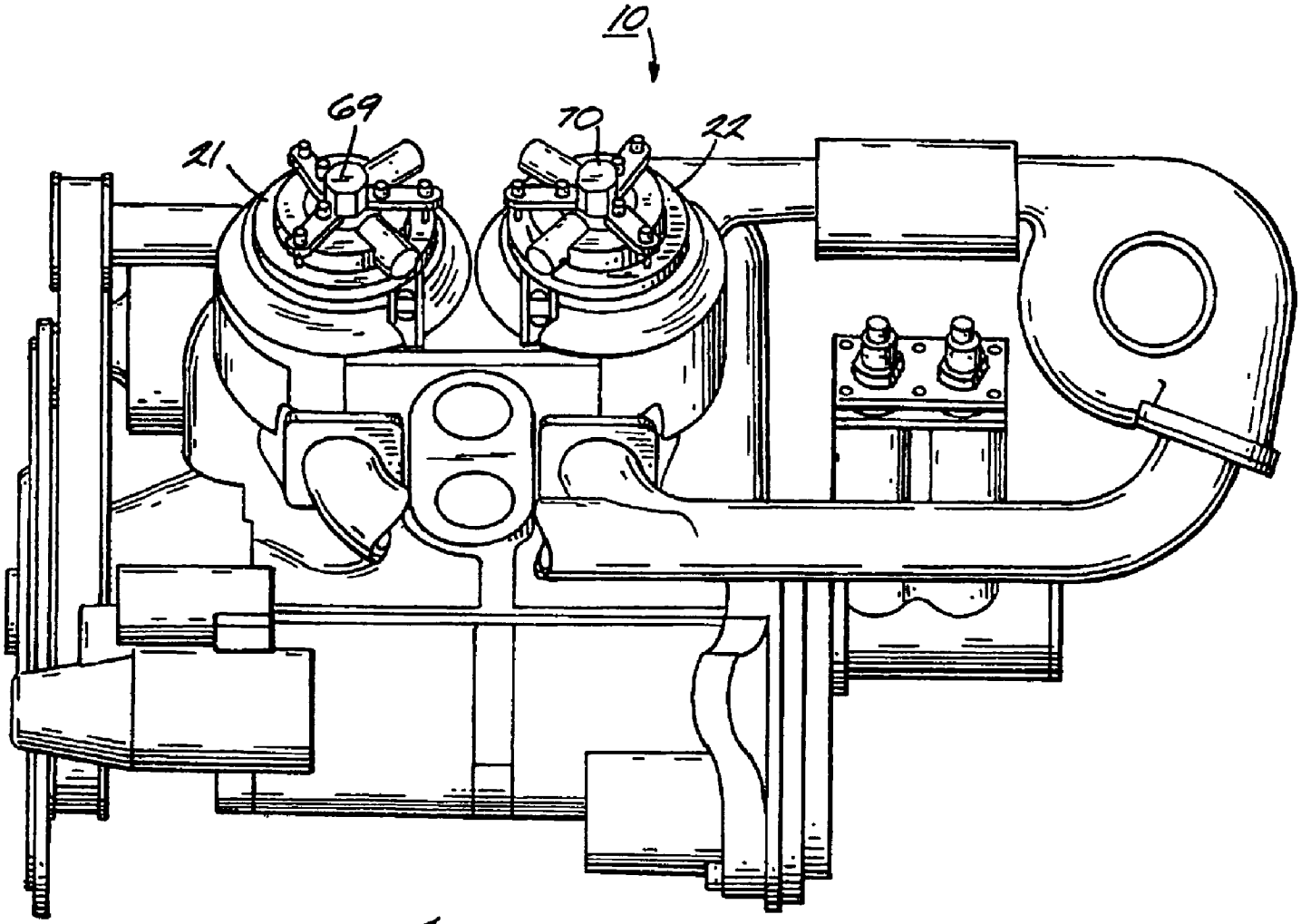
FIG. 1 is an elevational view of an internal combustion engine in which the present invention is employed.

Before the embodiments of the invention are explained in detail, it is to be understood that the invention is not limited to its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DESCRIPTION OF THE PREFERRED EMBODIMENTS

Illustrated in FIG. 1 is an internal combustion engine 10 in which the present invention is employed. It should be understood that the present invention is capable of use in other engines, and the engine 10 is merely shown and described as an example of one such engine. The engine 10 is a two-stroke, diesel aircraft engine. More particularly, the engine 10 is a V-type engine with four-cylinders. The improvements described herein are particularly well suited for use in such engines, but may be used in other internal combustion engines.

Figure 2:
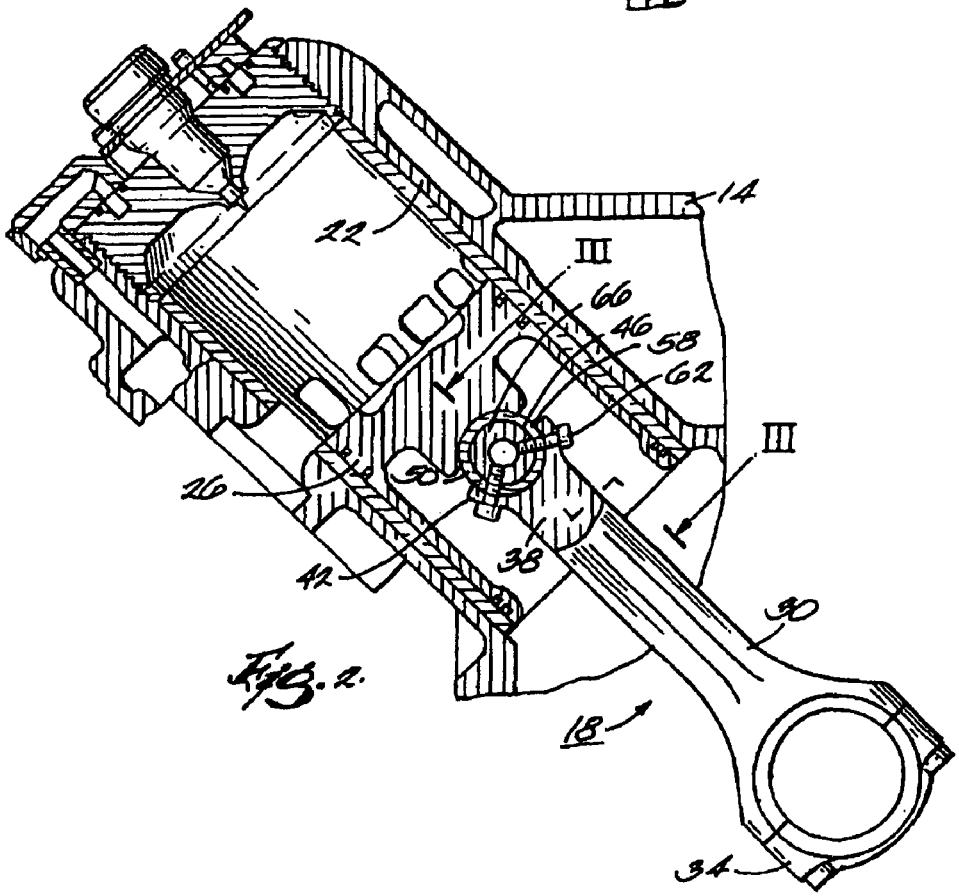
FIG. 2 is a sectional view illustrating, among other things, a cylinder head, a cylinder, a piston and a connecting rod of the engine of FIG. 1.

FIG. 2 shows a section view of a portion of the engine 10 of FIG. 1. An engine block 14 at least partially defines a crankcase 18 (see also, FIG. 9) and two banks of four cylinders (only two are illustrated and have reference numerals 21 and 22 in FIG. 1). The four cylinders are generally identical, and only one cylinder 22 will be described in detail. A crankshaft (not shown) is rotatably supported within the crankcase 18. A piston 26 reciprocates in the cylinder 22 and is connected to the crankshaft via connecting rod 30. As the piston 26 reciprocates within the cylinder 22, the crankshaft rotates.

The connecting rod 30 includes a first end 34 which is connected to the crankshaft. The connecting rod 30 further includes a second end 38 which includes an arcuate portion 42 that does not completely encircle the wrist pin 46. Preferably, the arcuate portion 42 of the connecting rod 30 has an arcuate extent that is about or slightly less than 180°. The wrist pin 46 has an annular wall 50 including a cylindrical inner surface 54 (FIG. 3) and a cylindrical outer surface 58, which engages the arcuate portion 42 of the connecting rod 30, and is pivotally connected to the piston 26. A plurality of fasteners 62 extend through the annular wall 50 of the wrist pin 46 and into a wrist pin insert 66 (see also, FIG. 3) to secure the wrist pin 46 to the arcuate portion 42 of the connecting rod 30. Preferably, the wrist pin insert 66 is cylindrical. Preferably, the fasteners are screws and thread into the wrist pin insert.

Figure 3:
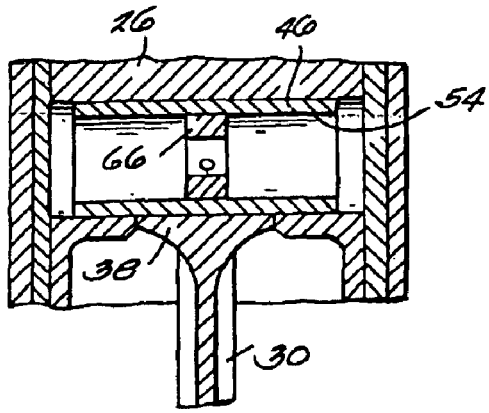
FIG. 3 is a cross-sectional view taken along line III—III of FIG. 2

As shown in FIG. 3, since the upper or second end 38 of the connecting rod 30 does not encircle the wrist pin 46, the piston 26 bears against the wrist pin 46 along the entire top of the wrist pin 46, thereby more evenly distributing the load on the wrist pin 46. The use of the wrist pin insert 66 further increases the strength and stability of the wrist pin 46. The forced rocking of the wrist pin 46 as the connecting rod 30 pivots, and the increased bearing surface area of the wrist pin 46 minimizes uneven wear on the wrist pin 46 bearing surface during operation of the engine 10.

Figure 6:
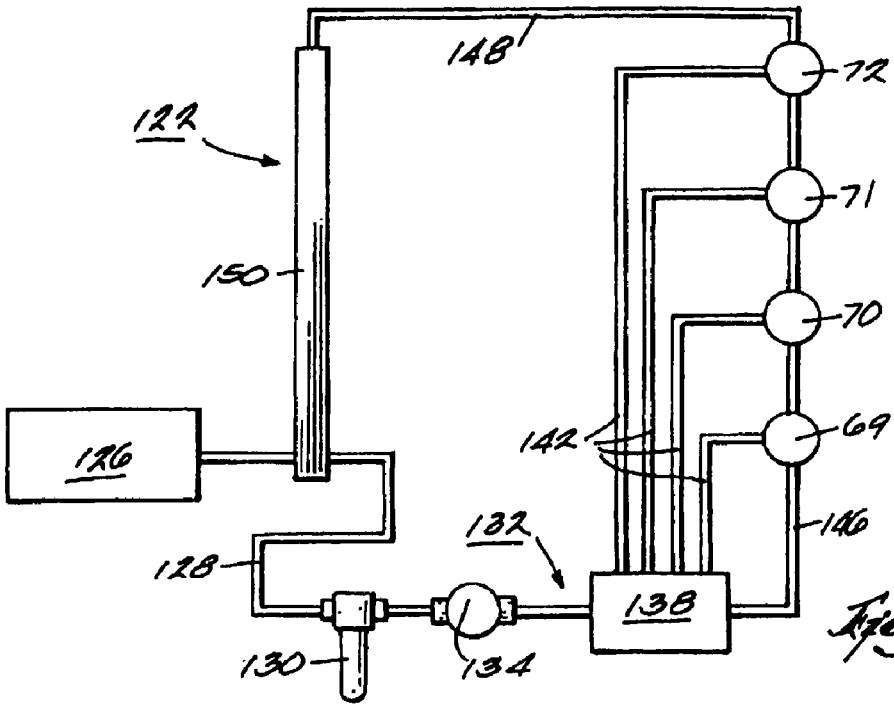
FIG. 6 is a schematic of a fuel injection system for the engine of FIG. 1.
Figure 4:
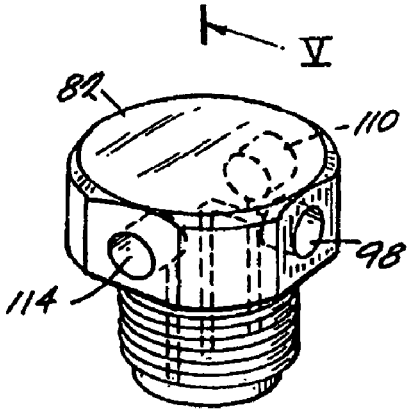
FIG. 4 is a perspective view of a fuel injector body of the engine of FIG. 1.
Figure 5:
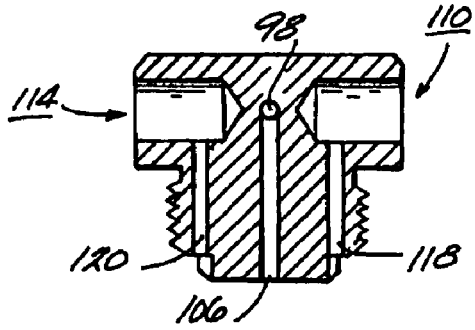
FIG. 5 is a cross-sectional view taken along line V—V of FIG. 4.
Figure 7:
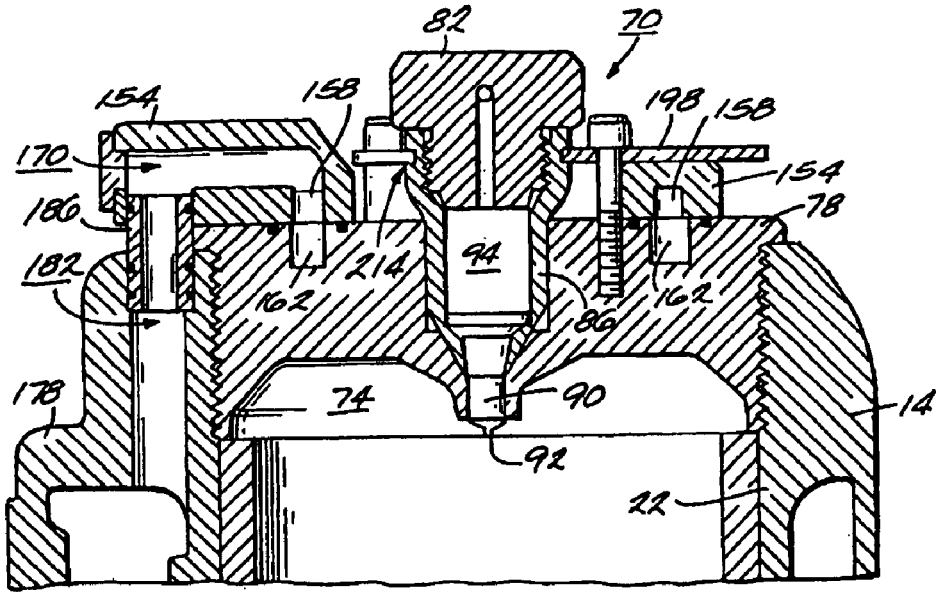
FIG. 7 is a cross-sectional view taken along line VII—VII of FIG. 8.

As shown schematically in FIG. 6, the engine 10 includes four fuel injectors 69, 70, 71 and 72, one for each cylinder. The fuel injectors are substantially identical, and only one will be described in detail. FIG. 7 illustrates in section, among other things, the fuel injector 70, which injects fuel into a combustion chamber 74 defined by a cylinder head 78, the cylinder 22 and the piston 26 (not shown in FIG. 7). The fuel injector 70 includes a fuel injector nut 86 which is received by an appropriately sized tapered bore in the cylinder head 78. Inside the nut 86 is a fuel injector tip 90 housing a pressure responsive, movable pintle (not shown). The nut 86 and the tip 90 define a main fuel outlet 92 communicating with the combustion chamber 74. A fuel injector body 82 is threaded into the upper end of the nut 86. As best shown in FIGS. 4 and 5, the fuel injector body 82 includes a main fuel inlet port 98, a portion of a fuel passage 106 which communicates between the main fuel inlet port 98 and the main fuel outlet port 92 (FIG. 7), a cooling fuel inlet port 110, a leak-off fuel outlet port 114, an upstream portion 118 of a cooling fuel passage which communicates between the cooling fuel inlet port 110 and the leak-off fuel outlet port 114, and a downstream portion 120 of the cooling fuel passage. Although not shown, the fuel injector further includes a flow straightener, a check valve, a check valve receiver, a spring mechanism and a spring guide, all of which are positioned within the hollow space 94 of the fuel injector nut 86 between the body 82 and the tip 90. Except for the cooling fuel inlet port 110 and the passage portion 118, the fuel injector 70 is conventional and known to those skilled in the art. The addition of the port 110 and the passage portion 118 allows cooling of the fuel injector as described below.

FIG. 6 illustrates a fuel flow schematic for a fuel injection system 122. Shown is fuel supply tank 126, fuel line 128, fuel filter 130, fuel pump 132 which includes delivery pump 134 and high pressure pump 138, fuel lines 142, bypass fuel line 146, fuel injectors 69, 70, 71 and 72, return fuel line 148 and return fuel tank 150. Referring also to FIGS. 4–5 and 7, overflow fuel expelled from the fuel pump 132 flows through the bypass fuel line 146, into the cooling fuel inlet port 110 of the fuel injector 69, through the inlet portion 118 of the cooling fuel passage in the fuel injector body 82, into the space below the fuel injector nut 86, where leak-off fuel normally flows, and around the flow straightener, the check valve, the check valve receiver, the spring mechanism and the spring guide, to commingle with the leak-off fuel, through the outlet portion 120 of the cooling fuel passage in the fuel injector body 82, and out the leak-off fuel outlet port 114 of the fuel injector body 82 where the leak-off fuel normally exits. The fuel flowing out of the port 114 of the fuel injector 69 then flows into the port 110 of the fuel injector 70 and flows through the fuel injector 70 in the same manner, and so on.

As can be appreciated, as the overflow fuel cools the fuel injectors, the overflow fuel is warmed. The overflow fuel is recirculated through the fuel injection system 122 by way of return fuel line 148. The warmed overflow fuel will flow through the fuel filter 130 on its way back to the fuel pump 132 to resist excessive build-up of ice on the fuel filter 130 during cold weather.

Figure 8:
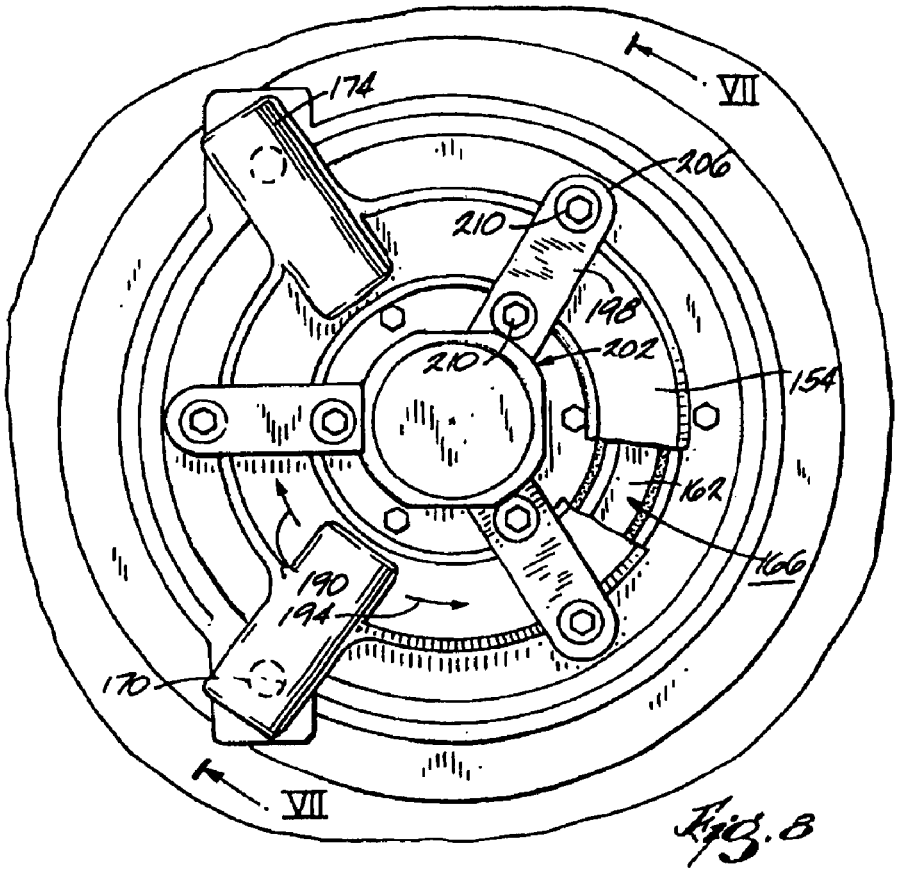
FIG. 8 is a top-view of FIG. 7.

FIGS. 7 and 8 illustrate a cooling cap 154 mounted on the cylinder head 78 to cool the cylinder head 78. The cooling cap 154 has an annular coolant groove 158 which mates with an annular coolant groove 162 of the cylinder head 78 to define an annular cooling passageway 166 when the cooling cap 154 is mounted on the cylinder head 78. In other embodiments, such as the embodiment which is illustrated in FIGS. 10–13, only one of the cooling cap 154 and the cylinder head 78 includes a groove such that the combination of the cooling cap 154 and the cylinder head 78 define an annular cooling passageway 166. The cooling cap 154 includes inlet 170 and outlet 174 ports which communicate with the annular cooling passageway 166, so that cooling fluid can flow into the inlet port 170, through the annular cooling passageway 166 and out the outlet port 174, thereby cooling the cylinder head 78. As used within the claims, "substantially annular" includes a completely enclosed loop similar to that illustrated in FIGS. 7 and 8, and a partial loop similar to that illustrated in FIGS. 10–13 (e.g., an annular groove that is separated by a divider pin, or projection 406).

The engine block 14 includes a cooling jacket 178 with an outlet 182 and an inlet (not shown). The cooling cap 154 is placed on the cylinder head 78 with the inlet port 170 in alignment with the outlet port 182 of the cooling jacket 178 and the outlet port 174 in alignment with the inlet port of the cooling jacket 178. A first transfer tube 186 communicates between the inlet port 170 of the cooling cap 154 and the outlet port 182 of the cooling jacket 178, and a second transfer tube (not shown) communicates between the outlet port 174 of the cooling cap 154 and the inlet port of the cooling jacket 178.

As shown, the inlet port 170 and the outlet port 174 of the cooling cap 154 are not diametrically opposed around the annular cooling passageway 166. Thus, a first portion of the annular cooling passageway 166 extends in one direction from the inlet port 170 to the outlet port 174 (representatively shown as arrow 190 in FIG. 8) and a second portion of the annular cooling passageway 166 extends in an opposite direction from the inlet port 170 to the outlet port 174 (representatively shown as arrow 194 in FIG. 8). The first portion of the annular cooling passageway 166 is shorter in length than the second portion of the annular cooling passageway 166. So that the flow rate through the annular cooling passageway 166 in either direction is proportional to the distance traveled, the first portion of the annular cooling passageway 166 is restricted. In this way, cooling fluid travels in both directions through the annular cooling passageway 166 to cool the cylinder head 78.

The cooling cap 154 is adjustably positionable around the cylinder head 78, so that the inlet port 170 and the outlet port 174 are properly alignable with the associated inlet and outlet ports of the cooling jacket 178. This is especially advantageous for a preferred embodiment of the present invention in which the cylinder head 78 threads into the cylinder block or engine block 14. As shown, the engine block 14 includes female threads concentric with the cylinder 22, and the cylinder head 78 includes male threads which engage the female threads of the engine block 14. Because the cylinder head 78 threads into the engine block 14, it is not exactly known where the cylinder head 78 will be located with respect to the engine body 14. Once the adjustable cooling cap 154 is properly located on the cylinder head 78, a plurality of clamping members 198, preferably equally spaced apart, span across the top of the cooling cap 154 to secure the cooling cap 154 to the cylinder head 78. Each of the clamping members 198 has opposite ends 202 and 206, and is secured to the cylinder head 78 by a pair of fasteners 210. One fastener 210 is located adjacent end 202 and the other fastener 210 is located adjacent end 206. Preferably, the fasteners 210 thread into the top of the cylinder head 78. Preferably, the cylinder head 78 includes a plurality of sets of pre-drilled, threaded holes such that each fastener 210 can be located in a plurality of positions relative to the cylinder head 78. Preferably, end 202 of each clamping member 198 is received by an annular groove 214 in the fuel injector nut 86, thereby also securing the fuel injector 70 to the cylinder head 78.

In the embodiment illustrated in FIGS. 7 and 8, the coolant initially flows from a pump (not shown) into the cooling jacket 178. From the cooling jacket 178, the coolant flows into the annular cooling passageway 166 through the outlet port 182 of the cooling jacket 178, the first transfer tube 186, and the inlet port 170 of the cooling cap 154. From the inlet port 170, the coolant travels through the cooling passageway 166 to the outlet port 174 of the cooling cap 154 removing heat from the cylinder head 78. The coolant then flows from the outlet 174 of the cooling cap 154 through the second transfer tube and inlet port of the cooling jacket 178 to return to the cooling jacket 178. From the cooling jacket 178, the heated coolant is returned to the pump of the coolant system to be cooled and returned to the cooling jacket 178.

Figure 14:
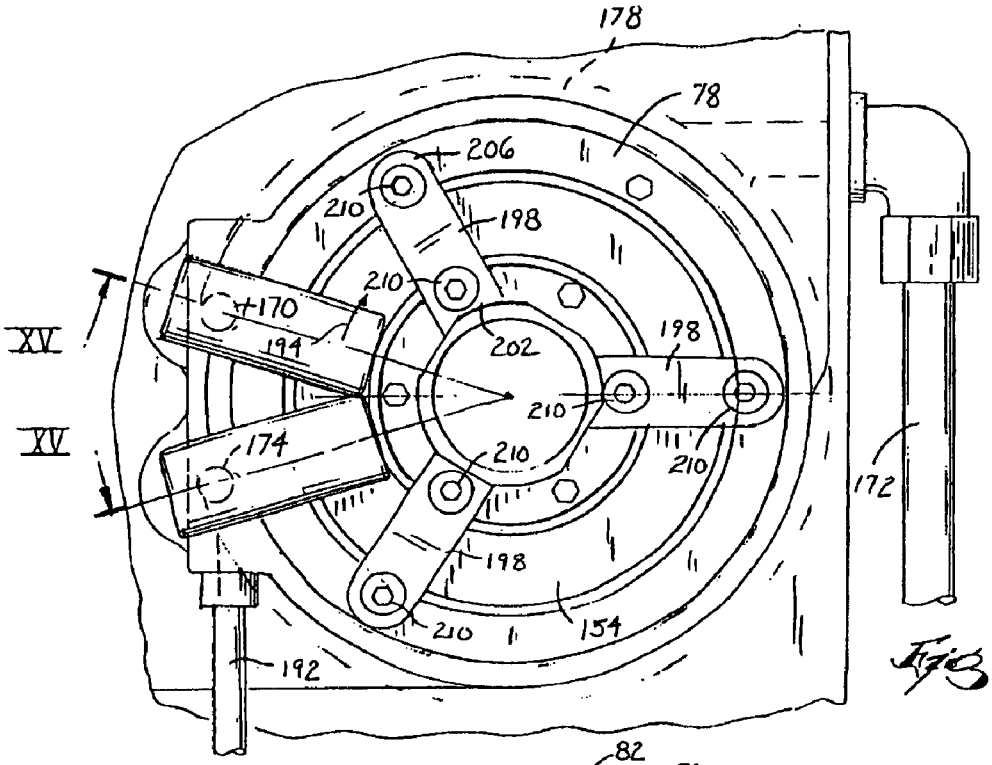
FIG. 14 is a top view of a cylinder head and cooling cap according to another embodiment of the invention.
Figure 15:
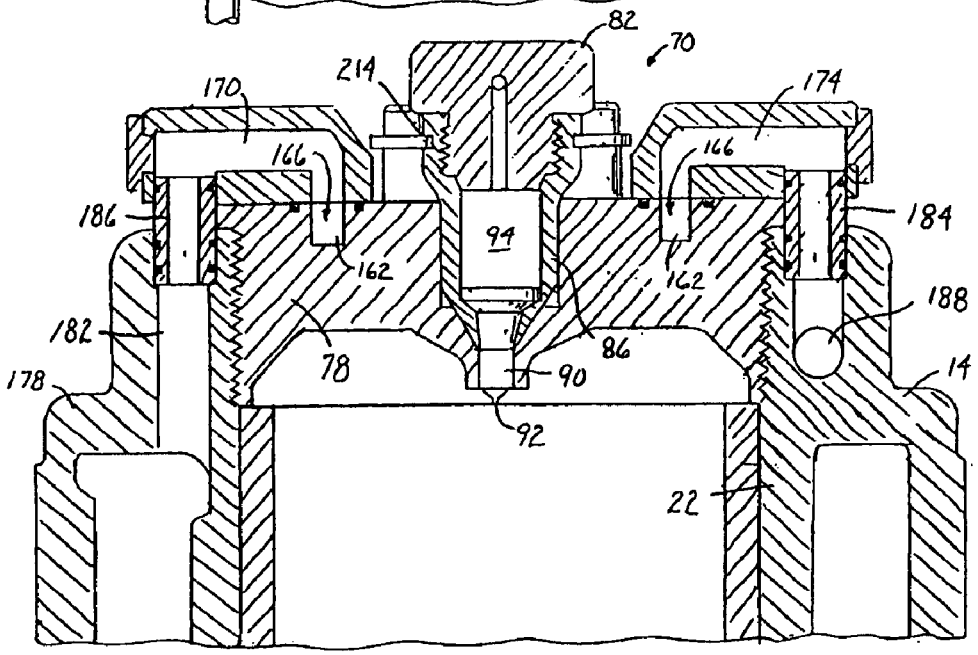
FIG. 15 is a cross-sectional view taken along line XV—XV of FIG. 14.

Another embodiment of the cooling cap 154 is illustrated in FIGS. 14 and 15. This embodiment is substantially similar to the embodiment shown in FIGS. 7 and 8 except that the embodiment illustrated in FIGS. 14 and 15 includes a different coolant flow path. Reference numbers used with respect to the embodiment illustrated in FIGS. 7 and 8 are also used in FIGS. 14 and 15 to indicate like components.

With reference to FIGS. 14 and 15, the coolant initially flows from a pump (not shown), through a supply conduit 172, and into the cooling jacket 178. From the cooling jacket 178, the coolant flows into through the outlet port 182 of the cooling jacket 178, through the first transfer tube 186, through the inlet port 170 of the cooling cap 154, and into the annular cooling passageway 166. From the inlet port 170, the coolant travels through the cooling passageway 166 in the direction of arrow 194 to the outlet port 174 of the cooling cap 154 removing heat from the cylinder head 78. In this embodiment, the coolant is blocked from flowing toward the outlet 174 in a direction opposite to the arrow 194. The coolant then flows from the outlet 174 of the cooling cap 154 through a second transfer tube 184 and into a return port 188. From the return port 188, the coolant is directed back to the pump through the return line 192 to be cooled and returned to the cooling jacket 178 through the supply conduit 172. As just described, the coolant flows into the cooling jacket 178, then flows into the cooling cap 154, and then returns to the pump. In contrast, the coolant used with the embodiment illustrated in FIGS. 7 and 8 flows into the cooling jacket 178, then flows into the cooling cap 154, then flows back into the cooling jacket 178, and then finally returns to the pump.

Figure 9:
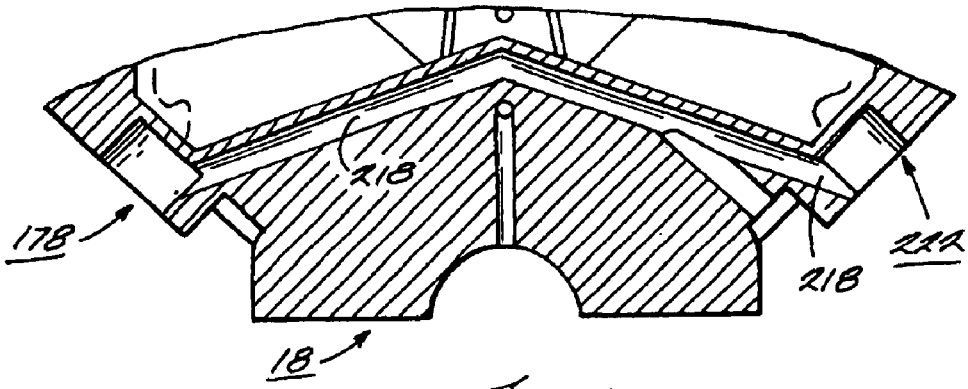
FIG. 9 is a sectional view illustrating the cross-feed passageway between the cylinder banks of the engine of FIG. 1.

FIG. 9 illustrates a cross-feed cooling passageway 218 which extends between a first cooling jacket 178 and a second cooling jacket 222 of the V-type engine of FIG. 1. The cross-feed cooling passageway 218 provides cooling fluid flow between the cooling jackets 178 and 222. The cross-feed cooling passageway 218 is drilled through the portion of the engine block 14 supporting the main bearing support for the crankshaft. The cutaway portion of FIG. 1 shows the general location of the cross-feed passageway 218 in the engine 10. If a thermostat communicating with the one of the cooling jackets 178 and 122 fails, the cross-feed cooling passageway 218 enables cooling fluid to continue to flow to minimize or prevent damage to the associated cylinder head 78. The cross-feed cooling passageway 218 also reduces the thermal gradient between the cylinder heads 78 and the lower crankcase of the engine 10 to increase engine life.

Figure 10:
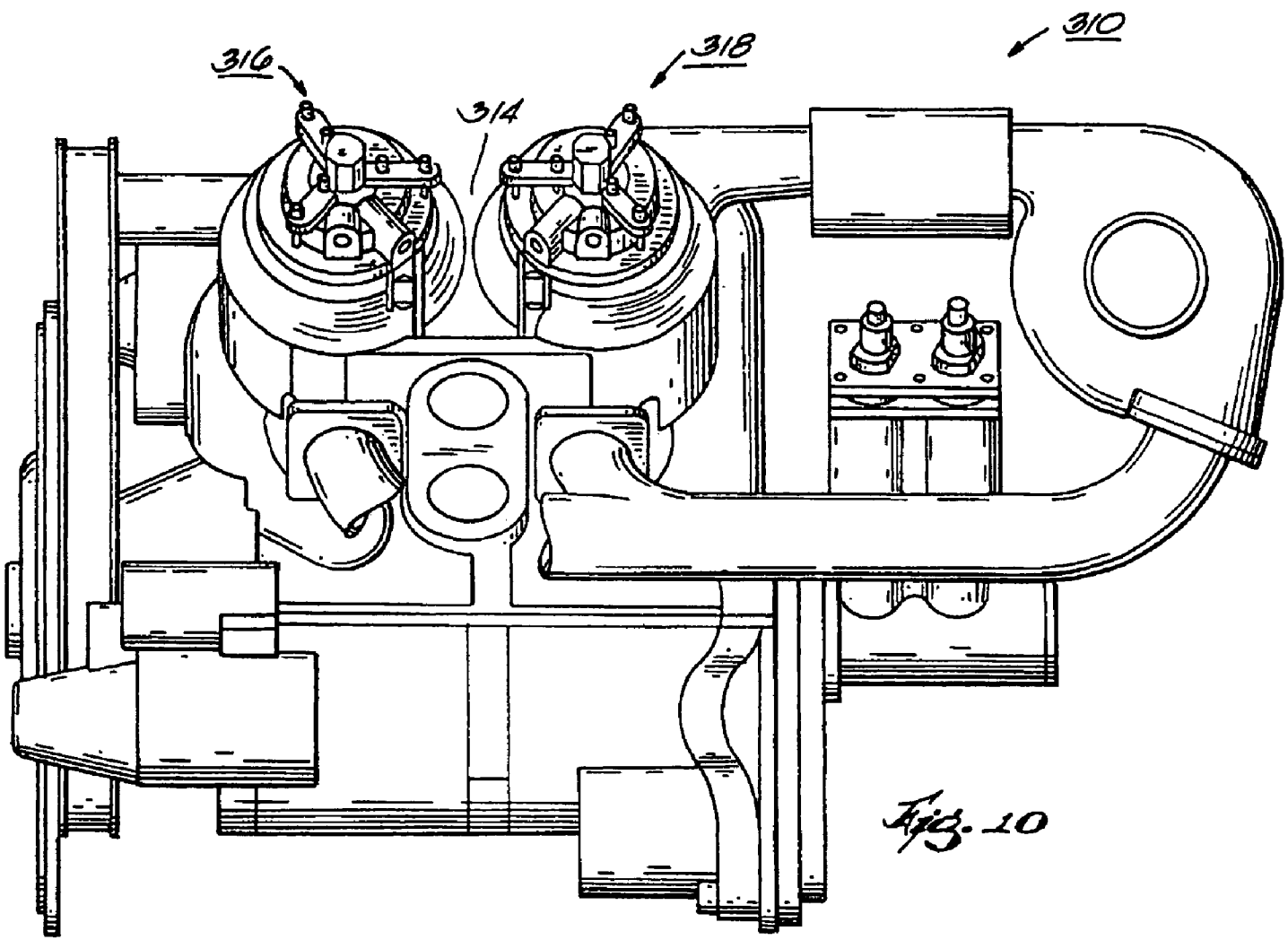
FIG. 10 is an elevational view of another internal combustion engine in which the present invention is employed.

Illustrated in FIG. 10 is another internal combustion engine 310 in which the present invention is employed. It should be understood that the present invention is capable of use in other engines, and the engine 310 is merely shown and described as an example of one such engine. The engine 310 is a two-stroke, diesel aircraft engine, which is substantially similar to the engine 10 of FIG. 1. More particularly, the engine 310 is a V-type engine with four cylinders.

Figure 11:
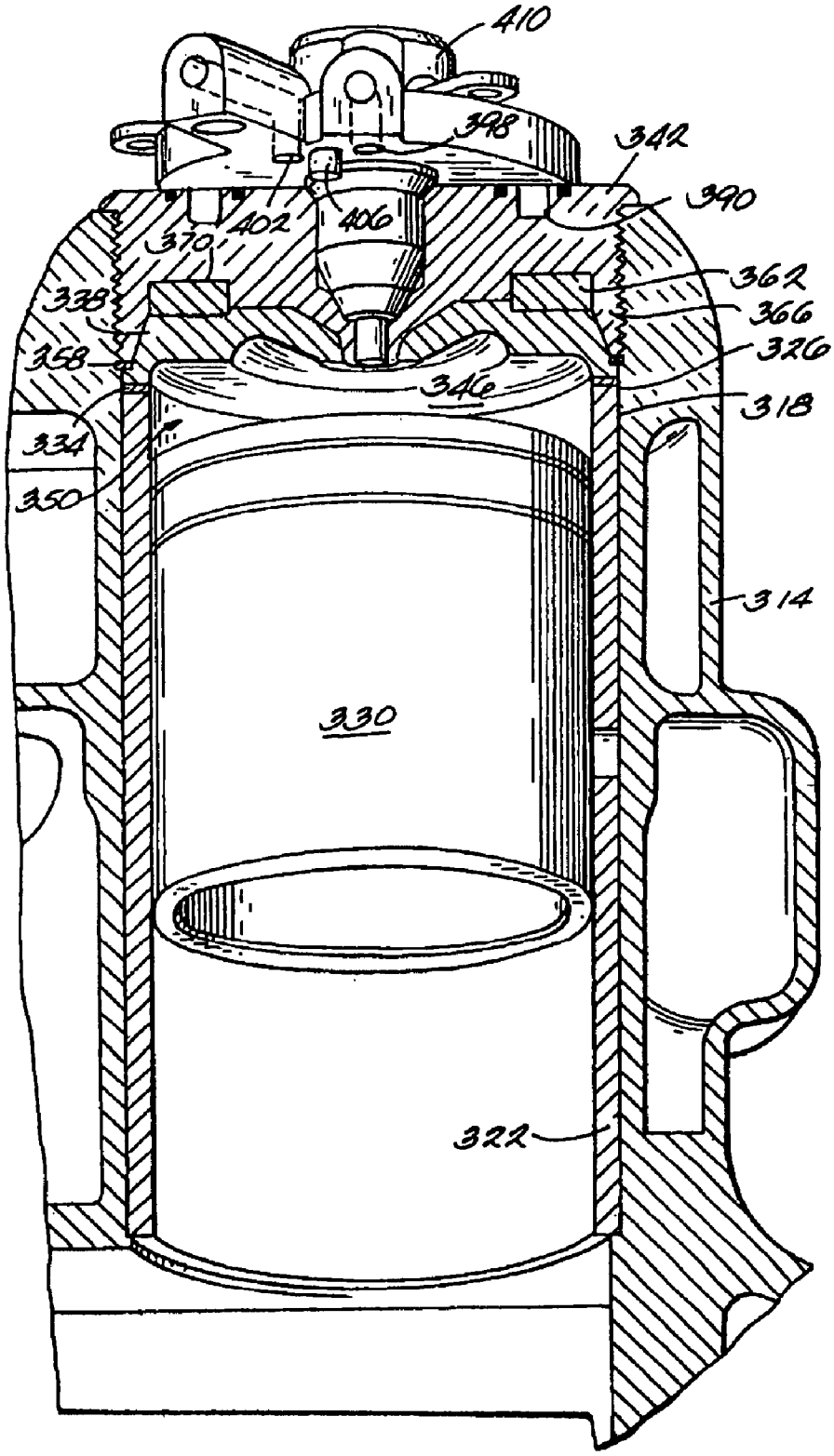
FIG. 11 is a partial sectional view of a portion of the engine shown in FIG. 10.
Figure 12:
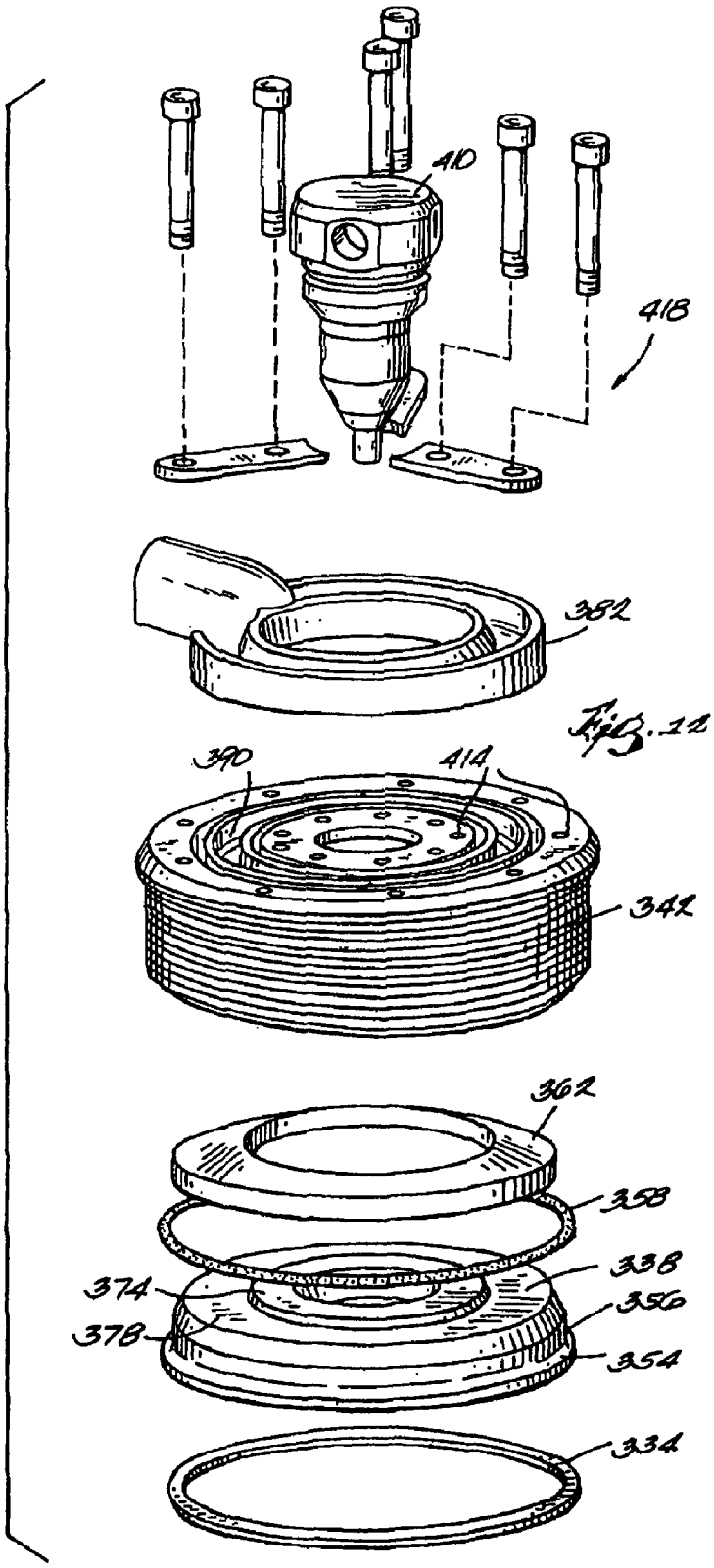
FIG. 12 is an exploded perspective view of certain components of the engine of FIG. 10 and as further shown in FIG. 11.
Figure 13:
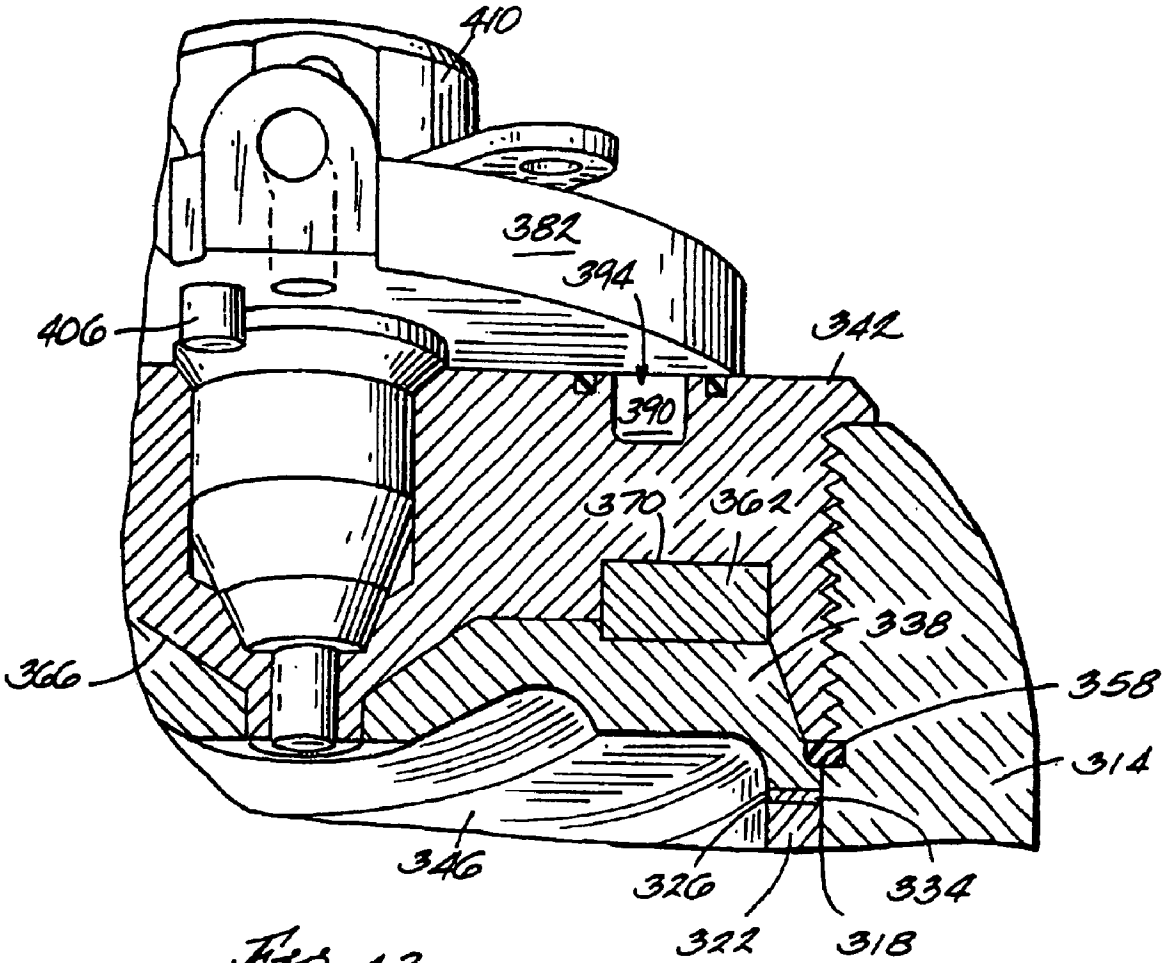
FIG. 13 is an enlarged view of a portion of FIG. 11.

As shown in FIG. 10, an engine block 314 at least partially defines two banks of four cylinders (only two are illustrated and have reference numerals 316 and 318). The four cylinders are generally identical, and only one cylinder 318 will be described in detail. FIGS. 11–13 show various views of portions of the engine 310 of FIG. 10.

A cylindrical sleeve 322 is positioned within the cylinder 318. Preferably, the sleeve 322 is an aluminum sleeve that is shrink fitted into the cylinder 318 and bonded to the engine block 314 with an epoxy resin having an aluminum filler. The sleeve 322 includes a shoulder 326. A piston 330 reciprocates within the sleeve 322.

A gasket 334 is positioned on the shoulder 326 of the sleeve 322. The gasket 334 is preferably made of a compliant material which can form to the shape of mating components, and which is also made of a material which is highly conductive for rapid heat dissipation. In a highly preferred embodiment, the gasket 334 is a copper gasket. As will be further explained below, the, gasket 334 acts as both a sealing mechanism and a shimming device.

A fireplate 338 is positioned between a cylinder head 342 and the gasket 334. A bottom side 346 of the fireplate 338 cooperates with the piston 330 to define a combustion chamber 350. An annular ledge 354 on the fireplate 338 receives an O-ring 358 to provide a seal between the side wall 356 of the fireplate 338 and the cylinder 318. In a preferred design, the cylinder head 342 is made of aluminum and the fireplate 338 is made of stainless steel.

A head spring 362 is positioned between the cylinder head 342 and the fireplate 338. A bottom side 366 of the cylinder head 342 has an annular groove 370 which receives the head spring 362, and a top side 374 of the fireplate 338 has a recess 378 which also receives the head spring 362. The head spring 362 is preferably a belleville spring. The head spring 362 is also preferably made of stainless steel. As generally known in the art, belleville springs take the form of a shallow, conical disk with a hole through the center thereof. A very high spring rate or spring force can be developed in a very small axial space with these types of springs. Predetermined load-deflection characteristics can be obtained by varying the height of the cone to the thickness of the disk. The importance of being able to obtain a predetermined spring force in regards to the present invention will be made clear below.

As can be observed with reference to FIGS. 11–13, the cylinder head 342 threads into a portion of the engine block 314. When the cylinder head 342 is threaded into the engine block, the cylinder head 342 compresses the head spring 362 against the fireplate 338 to provide a downward force against the top side 374 of the fireplate 338 to offset an upward force created by combustion within the combustion chamber 350. The downward force provided by the spring 362 substantially ensures that the fireplate 338 will remain in contact with the gasket 334, and that the gasket 334 will remain in contact with the shoulder 326 of the sleeve 322 to provide an appropriate combustion seal during operation of the engine 310.

The head spring 362 also acts to allow for the expansion and contraction of the relevant mating engine components during changing thermal conditions of the engine 310 without adversely affecting the combustion seal, much like traditional head bolts act. As noted above, head bolts can be used to provide a clamping force that seals a cylinder head to an engine block. Because the head bolts are allowed to expand and contract with the associated engine components as the temperature of the engine varies, the head bolts are capable of maintaining the clamping force during operation of the engine. However, in the case of the present invention, the threaded cylinder head 342 does not generally have the stretching capabilities of typical head bolts because of its relatively large diameter and short thread length. Thus, the head spring 362 provides the desired clamping force in lieu of traditional head bolts to create the proper combustion seal.

As suggested above, the load provided by the head spring 362 can be calculated based on the deflection of the spring 362. In this way, a guaranteed amount of downward force can be provided to ensure a proper combustion seal. To obtain the desired deflection for the head spring 362, the cylinder head 342 and associated components are assembled as follows.

The piston 330 is located in its top dead center position. The gasket 334 is positioned on the shoulder 326 of the sleeve 322. The fireplate 338 is positioned on the gasket 334 to create a predetermined volume for the combustion chamber 350. The gasket 334 is appropriately sized to obtain the desired volume for the combustion chamber 350. The gasket 334 accommodates the assembly stack up tolerances associated with the engine block 314, the cylinder head 342, the sleeve 322, and the piston 330. After the fireplate 338 is positioned on the gasket 334, the cylinder head 342 is threaded into the engine block 314 until such time as the bottom side 366 of the cylinder head 342 contacts the top side 374 of the fireplate 338. Once contact is made between the cylinder head 342 and the fireplate 338, the final assembly position of the cylinder head 342 with respect to the engine block 314 is known. The final assembly position of the cylinder head 342 is then marked or otherwise recorded for future reference. Thereafter, the cylinder head 342 is unthreaded from the engine block 314 and the head spring 362 is positioned between the cylinder head 342 and the fireplate 338. The cylinder head 342 is then threaded a second time into the engine block 314 until the cylinder head 342 is located in the final assembly position. The threading of the cylinder head 342 into the engine block compresses the spring 362 between the cylinder head 342 and the fireplate 338. Knowing the desired deflection amount for the spring 362 and where the final assembly position will be for the cylinder head 342, ensures that a sufficient load will be applied against the fireplate 338 to offset the upward force generated by the combustion within the combustion chamber in order to provide the desired combustion seal.

Another feature of the present invention concerns providing a cooling system for the cylinder head 342. A cooling cap 382 is mounted on the cylinder head 342. The cooling cap 382 cooperates with an annular groove 390 of the cylinder head 342 to define a cooling passageway 394. The cooling cap 382 includes an inlet port 398 and an outlet port 402. The inlet port 398 is adapted to receive a cooling fluid flowing through the engine 310, and the outlet port 402 is adapted to send the cooling fluid on through the engine 310 after the cooling fluid has been used to cool the cylinder head 342. As best shown in FIG. 11, the inlet port 398 and the outlet port 402 are practically adjacent to one another. A divider pin, or projection 406 extends from the cooling cap 382 into the cooling passageway 394 to substantially close the short passageway between the inlet port 398 and the outlet port 402. In this way, the cooling fluid is only allowed to flow around the cooling passageway 394 in a single direction to cool the cylinder head 342. Although allowing the cooling fluid to flow in both directions around the cooling passageway 394 between the inlet port 398 and an outlet port 402 would cool the cylinder head 342, it has been determined that causing the cooling fluid to flow in one direction around substantially the entire cooling passageway 394 also provides effective cooling. In other embodiments, the divider pin 406 is eliminated and only a partial annular groove is formed in the cylinder head 342 and/or the cooling cap 382 such that the combination of the cylinder head 342 and the cooling cap 382 define a unidirectional cooling passage without the need for a divider pin 406.

The manner of attaching the cooling cap 382 to the cylinder head 342 is substantially described above in relation to engine 10. Reference is also made to the description above in relation to engine 10 for the description and manner of operating the fuel injector 410. One difference worth noting between engine 10 and engine 310 is that the cylinder head 342 of the subject application includes nine sets of holes 414 for the associated clamping members 418, as compared to the six sets of holes as shown for engine 10. It was determined that nine sets of holes is preferred to enable the desired positioning of the cooling cap 382 with respect to the cylinder head 342.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art. It is understood that the invention disclosed and defined herein extends to all alternative combinations of two or more of the individual features mentioned or evident from the text and/or drawings. All of these different combinations constitute various alternative aspects of the present invention.

Various features of the invention are set forth in the following claims.

What is claimed is:

1. An internal combustion engine, comprising:

an engine block at least partially defining a cylinder;

a cylinder head mounted on said cylinder; and a cooling cap mounted on said cylinder head, wherein at least one of said cylinder head and said cooling cap includes a substantially annular coolant groove such that said cooling cap and said cylinder head define a substantially annular cooling passageway, said cooling cap also including inlet and outlet ports communicating with said cooling passageway so that cooling fluid can flow into said inlet port, through said cooling passageway, and out of said outlet port, thereby cooling said cylinder head.

2. An internal combustion engine according to claim 1, wherein said cylinder head threads into a portion of said engine block, wherein said engine block includes a cooling jacket with an outlet and an inlet, and wherein said cooling cap is placed on said cylinder head with said inlet port in alignment with said cooling jacket outlet and with said outlet port in alignment with said cooling jacket inlet.

3. An internal combustion engine according to claim 2, further comprising a transfer tube communicating between said inlet port and said cooling jacket outlet, and a transfer tube communicating between said outlet port and said cooling jacket inlet.

4. An internal combustion engine according to claim 1, wherein said inlet port and said outlet port are not diametrically opposed around said cooling passageway, such that a first portion of said cooling passageway extends in one direction from said inlet port to said outlet port and a second portion of said cooling passageway extends in an opposite direction from said inlet port to said outlet port, said first portion being shorter in length than said second portion and said first portion also being restricted.

5. An internal combustion engine according to claim 1, wherein said cooling cap is annular, and wherein said engine further comprises a plurality of clamping members spanning said cooling cap and securing said cooling cap to said cylinder head.

6. An internal combustion engine according to claim 5, wherein each of said clamping members has opposite ends and is secured to said cylinder head by a pair of fasteners, with one fastener located adjacent one of said ends and the other fastener located adjacent the other of said ends.

7. An internal combustion engine according to claim 6, wherein said fasteners thread into holes in said cylinder head, said cylinder head having therein a plurality of sets of holes such that each fastener can be located in a plurality of positions relative to said cylinder head.

8. An internal combustion engine according to claim 5, wherein said engine further includes a fuel injector secured to said cylinder head by said clamping members.

9. An internal combustion engine according to claim 1, wherein said engine is a two-stroke, diesel aircraft engine.

10. An internal combustion engine according to claim 1, wherein said engine block includes a return port and a cooling jacket having an outlet, wherein said cooling cap is placed on said cylinder head with said inlet port in alignment with said cooling jacket outlet and with said outlet port in alignment with said return port.

11. An internal combustion engine according to claim 10, further comprising a transfer tube communicating between said inlet port and said cooling jacket outlet, and a transfer tube communicating between said outlet port and said return port.

12. An internal combustion engine according to claim 1, wherein cooling fluid flows into the inlet port, through the cooling passageway in a single direction, and out of the outlet.

13. An internal combustion engine according to claim 12, wherein said coolant groove is blocked between the inlet and outlet ports of the cooling cap so as to substantially close the cooling passageway in the direction opposite said single direction between the inlet and outlet ports of the cooling cap, thereby causing the cooling fluid to flow in said single direction around the cooling passageway.

14. An internal combustion engine according to claim 13, wherein said coolant groove is blocked by a projection that is located on the other of said cylinder head and said cooling cap and that extends into said coolant groove between the inlet and outlet ports of the cooling cap.

15. An internal combustion engine as set forth in claim 1, wherein the engine is a two-stroke, diesel aircraft engine.

16. An internal combustion engine, comprising:

an engine block at least partially defining a cylinder, the engine block including a cooling jacket;

a cylinder head mounted on the cylinder; and a cooling cap mounted on the cylinder head, wherein at least one of the cylinder head and the cooling cap has a coolant groove such that the cooling cap and the cylinder head define a cooling passageway, the cooling cap further having inlet and outlet ports communicating between the cooling passageway and the cooling jacket, such that cooling fluids flow into the inlet port, through the cooling passageway in a single direction, and out of the outlet port, thereby cooling the cylinder head.

17. An internal combustion engine as set forth in claim 16, wherein the cooling passageway is annular, and wherein the engine further comprises a divider member positioned between the inlet and outlet ports of the cooling cap so as to substantially close the annular cooling passageway in one direction between the inlet and outlet ports of the cooling cap, thereby ensuring that the cooling fluid flows in an opposite direction around the cooling passageway.

18. An internal combustion engine as set forth in claim 16, wherein the engine is a two-stroke, diesel aircraft engine.

19. An internal combustion engine according to claim 16, wherein said coolant groove is blocked between the inlet and outlet ports of the cooling cap so as to substantially close the cooling passageway in the direction opposite said single direction between the inlet and outlet ports of the cooling cap, thereby causing the cooling fluid to flow in said single direction around the cooling passageway.

20. An internal combustion two-stroke diesel engine for an aircraft, comprising:

an engine block at least partially defining a cylinder;

a cylinder head mounted on the cylinder;

a cooling cap mounted on the cylinder head;

one of the cylinder head and the cooling cap having therein an annular coolant groove such that the cooling cap and the cylinder head define therebetween a cooling passageway;

the cooling cap further having inlet and outlet ports communicating with the cooling passageway; and the other of the cylinder head and the cooling cap having there on a divider member that is positioned between the inlet and outlet ports and that extends into the coolant groove so as to substantially close the cooling passageway in one direction between the inlet and outlet ports of the cooling cap, thereby ensuring that the cooling fluid flows in an opposite direction around the cooling passageway.

*21. An internal combustion engine according to claim 1, further comprising:*

*a piston reciprocally operable within the cylinder;*

*a fireplate positioned between the cylinder head and the piston, the fireplate cooperating with the piston to define a combustion chamber; and*

*a head spring positioned between the cylinder head and the fireplate, such that the head spring provides a downward force against the fireplate to offset an upward force created by combustion within the combustion chamber.*

*22. An internal combustion engine as set forth in claim 21, wherein the cylinder head threads into a portion of the engine block.*

*23. An internal combustion engine as set forth in claim 21, wherein the cylinder head has an annular groove which receives the head spring.*

*24. An internal combustion engine as set forth in claim 23, wherein the fireplate has a recess which also receives the head spring.*

*25. An internal combustion engine as set forth in claim 21, wherein the cylinder includes a shoulder against which the head spring forces the fireplate.*

*26. An internal combustion engine as set forth in claim 25, further comprising a cylindrical sleeve positioned within the cylinder, wherein the piston reciprocally operates within the sleeve, and wherein the sleeve provides the shoulder.*

*27. An internal combustion engine as set forth in claim 26, further comprising a gasket positioned between the fireplate and the shoulder of the sleeve.*

*28. An internal combustion engine as set forth in claim 27, wherein the gasket is a copper gasket.*

*29. An internal combustion engine as set forth in claim 21, wherein the head spring is annular.*

*30. An internal combustion engine as set forth in claim 21, wherein the head spring is a belleville spring.*

*31. An internal combustion engine as set forth in claim 21, wherein the engine is a two-stroke, diesel aircraft engine.*

*32. An internal combustion engine according to claim 1, further comprising:*

*a cylindrical sleeve positioned within the cylinder, the sleeve including a shoulder, wherein the cylinder head is threadably mounted to a portion of the engine block and on the cylinder, the cylinder head having an annular groove;*

*a piston reciprocally operable within the sleeve;*

*a gasket supported on the shoulder of the sleeve;*

*a fireplate positioned between the cylinder head and the gasket, the fireplate having a top side which includes a recess, and a bottom side which cooperates with the piston to define a combustion chamber; and*

*a belleville spring positioned between the cylinder head and the fireplate such that the spring is received by the annular groove of the cylinder head and the recess of the fireplate, so that when the cylinder head is threaded into the engine block, the spring is compressed between the cylinder head and the fireplate to provide a downward force against the top side of the fireplate to offset an upward force created by combustion within the combustion chamber, thereby substantially ensuring that the fireplate remains in contact with the gasket, and the gasket remains in contact with the shoulder of the sleeve, to provide an appropriate combustion seal during operation of the engine.*

*33. An internal combustion engine as set forth in claim 32, wherein the gasket is a copper gasket.*

*34. An internal combustion engine as set forth in claim 32, wherein the engine is a two-stroke, diesel aircraft engine.*

*35. An internal combustion engine according to claim 1, wherein the engine block at least partially defines a crankcase, the engine further comprising:*

*a crankshaft rotatably supported within said crankcase;*

*a piston reciprocally operable within said cylinder;*

*a connecting rod for operatively coupling said piston to said crankshaft, said connecting rod including a first end connected to said crankshaft and a second end which includes an arcuate portion;*

*a wrist pin pivotally connected to said piston, said wrist pin having an annular wall including a cylindrical outer surface engaging said arcuate portion of said connecting rod, and said annular wall including a cylindrical inner surface;*

*a wrist pin insert within said wrist pin; and*

*a plurality of fasteners extending through said annular wall of said wrist pin and securing said arcuate portion of said connecting rod to said wrist pin insert, thereby securing said connecting rod to said wrist pin.*

*36. An internal combustion engine according to claim 35, wherein said second end of said connecting rod does not completely encircle said wrist pin.*

*37. An internal combustion engine according to claim 35, wherein said second end of said connecting rod has an arcuate extent of less than 180°.*

*38. An internal combustion engine according to claim 35, wherein said plurality of fasteners are threaded into said wrist pin insert.*

*39. An internal combustion engine according to claim 35, wherein said wrist pin insert is cylindrical.*

*40. An internal combustion engine according to claim 35, wherein said engine is a two-stroke, diesel aircraft engine.*

*41. An internal combustion engine according to claim 35, wherein substantially an entire longitudinal portion of said outer surface of said wrist pin engages said piston.*

*42. An internal combustion engine according to claim 1, wherein the engine block is a V-type engine block at least partially defining a first cylinder bank and a second cylinder bank, a first cooling jacket adjacent said first cylinder bank, and a second cooling jacket adjacent said second cylinder bank, said engine block further defining a cross-feed cooling passageway which extends between said first cooling jacket and said second cooling jacket, the engine further comprising:*

*a first thermostat in communication with said first cooling jacket; and*

*a second thermostat in communication with said second cooling jacket;*

*said cross-feed cooling passageway providing cooling fluid flow between said cooling jackets at least in the event of failure of one of said thermostats.*

*43. An internal combustion engine according to claim 42, wherein said engine is a two-stroke, diesel aircraft engine.*

*44. An internal combustion engine according to claim 1, wherein said engine block includes female threads concentric with said cylinder, and wherein said cylinder head includes male threads engaging said female threads on said engine block.*

*45. An internal combustion engine according to claim 16, further comprising:*

*a piston reciprocally operable within the cylinder;*

*a fireplate positioned between the cylinder head and the piston, the fireplate cooperating with the piston to define a combustion chamber; and*

*a head spring positioned between the cylinder head and the fireplate, such that the head spring provides a downward force against the fireplate to offset an upward force created by combustion within the combustion chamber.*

*46. An internal combustion engine as set forth in claim 45, wherein the cylinder head threads into a portion of the engine block.*

*47. An internal combustion engine as set forth in claim 45, wherein the cylinder head has an annular groove which receives the head spring.*

*48. An internal combustion engine as set forth in claim 47, wherein the fireplate has a recess which also receives the head spring.*

*49. An internal combustion engine as set forth in claim 45, wherein the cylinder includes a shoulder against which the head spring forces the fireplate.*

*50. An internal combustion engine as set forth in claim 49, further comprising a cylindrical sleeve positioned within the cylinder, wherein the piston reciprocally operates within the sleeve, and wherein the sleeve provides the shoulder.*

*51. An internal combustion engine as set forth in claim 50, further comprising a gasket positioned between the fireplate and the shoulder of the sleeve.*

*52. An internal combustion engine as set forth in claim 51, wherein the gasket is a copper gasket.*

*53. An internal combustion engine as set forth in claim 45, wherein the head spring is annular.*

*54. An internal combustion engine as set forth in claim 45, wherein the head spring is a belleville spring.*

*55. An internal combustion engine as set forth in claim 45, wherein the engine is a two-stroke, diesel aircraft engine.*

*56. An internal combustion engine according to claim 16, further comprising:*

*a cylindrical sleeve positioned within the cylinder, the sleeve including a shoulder, wherein the cylinder head is threadably mounted to a portion of the engine block and on the cylinder, the cylinder head having an annular groove;*

*a piston reciprocally operable within the sleeve;*

*a gasket supported on the shoulder of the sleeve;*

*a fireplate positioned between the cylinder head and the gasket, the fireplate having a top side which includes a recess, and a bottom side which cooperates with the piston to define a combustion chamber; and*

*a belleville spring positioned between the cylinder head and the fireplate such that the spring is received by the annular groove of the cylinder head and the recess of the fireplate, so that when the cylinder head is threaded into the engine block, the spring is compressed between the cylinder head and the fireplate to provide a downward force against the top side of the fireplate to offset an upward force created by combustion within the combustion chamber, thereby substantially ensuring that the fireplate remains in contact with the gasket, and the gasket remains in contact with the shoulder of the sleeve, to provide an appropriate combustion seal during operation of the engine.*

*57. An internal combustion engine as set forth in claim 56, wherein the gasket is a copper gasket.*

*58. An internal combustion engine as set forth in claim 56, wherein the engine is a two-stroke, diesel aircraft engine.*

*59. An internal combustion engine according to claim 16, wherein the engine block at least partially defines a crankcase, the engine further comprising:*

*a crankshaft rotatably supported within said crankcase;*

*a piston reciprocally operable within said cylinder;*

*a connecting rod for operatively coupling said piston to said crankshaft, said connecting rod including a first end connected to said crankshaft and a second end which includes an arcuate portion;*

*a wrist pin pivotally connected to said piston, said wrist pin having an annular wall including a cylindrical outer surface engaging said arcuate portion of said connecting rod, and said annular wall including a cylindrical inner surface;*

*a wrist pin insert within said wrist pin; and*

*a plurality of fasteners extending through said annular wall of said wrist pin and securing said arcuate portion of said connecting rod to said wrist pin insert, thereby securing said connecting rod to said wrist pin.*

*60. An internal combustion engine according to claim 59, wherein said second end of said connecting rod does not completely encircle said wrist pin.*

*61. An internal combustion engine according to claim 59, wherein said second end of said connecting rod has an arcuate extent of less than 180°.*

*62. An internal combustion engine according to claim 59, wherein said plurality of fasteners are threaded into said wrist pin insert.*

*63. An internal combustion engine according to claim 59, wherein said wrist pin insert is cylindrical.*

*64. An internal combustion engine according to claim 59, wherein said engine is a two-stroke, diesel aircraft engine.*

*65. An internal combustion engine according to claim 59, wherein substantially an entire longitudinal portion of said outer surface of said wrist pin engages said piston.*

*66. An internal combustion engine according to claim 16, wherein the engine block is a V-type engine block at least partially defining a first cylinder bank and a second cylinder bank, a first cooling jacket adjacent said first cylinder bank, and a second cooling jacket adjacent said second cylinder bank, said engine block further defining a cross-feed cooling passageway which extends between said first cooling jacket and said second cooling jacket, the engine further comprising:*

*a first thermostat in communication with said first cooling jacket; and*

*a second thermostat in communication with said second cooling jacket;*

*said cross-feed cooling passageway providing cooling fluid flow between said cooling jackets at least in the event of failure of one of said thermostats.*

*67. An internal combustion engine according to claim 66, wherein said engine is a two-stroke, diesel aircraft engine.*

*68. An internal combustion engine according to claim 16, wherein said engine block including female threads concentric with said cylinder, and wherein said cylinder head includes male threads engaging said female threads on said engine block.*

*69. An internal combustion engine according to claim 20, comprising:*

*a piston reciprocally operable within the cylinder;*

*a fireplate positioned between the cylinder head and the piston, the fireplate cooperating with the piston to define a combustion chamber; and*

*a head spring positioned between the cylinder head and the fireplate, such that the head spring provides a downward force against the fireplate to offset an upward force created by combustion within the combustion chamber.*

*70. An internal combustion engine as set forth in claim 69, wherein the cylinder head threads into a portion of the engine block.*

*71. An internal combustion engine as set forth in claim 69, wherein the cylinder head has an annular groove which receives the head spring.*

*72. An internal combustion engine as set forth in claim 71, wherein the fireplate has a recess which also receives the head spring.*

*73. An internal combustion engine as set forth in claim 69, wherein the cylinder includes a shoulder against which the head spring forces the fireplate.*

*74. An internal combustion engine as set forth in claim 73, further comprising a cylindrical sleeve positioned within the cylinder, wherein the piston reciprocally operates within the sleeve, and wherein the sleeve provides the shoulder.*

*75. An internal combustion engine as set forth in claim 74, further comprising a gasket positioned between the fireplate and the shoulder of the sleeve.*

*76. An internal combustion engine as set forth in claim 75, wherein the gasket is a copper gasket.*

*77. An internal combustion engine as set forth in claim 69, wherein the head spring is annular.*

*78. An internal combustion engine as set forth in claim 69, wherein the head spring is a belleville spring.*

*79. An internal combustion engine as set forth in claim 69, wherein the engine is a two-stroke, diesel aircraft engine.*

*80. An internal combustion engine according to claim 20, comprising:*

*a cylindrical sleeve positioned within the cylinder, the sleeve including a shoulder, wherein the cylinder head is threadably mounted to a portion of the engine block and on the cylinder, the cylinder head having an annular groove;*

*a piston reciprocally operable within the sleeve;*

*a gasket supported on the shoulder of the sleeve;*

*a fireplate positioned between the cylinder head and the gasket, the fireplate having a top side which includes a recess, and a bottom side which cooperates with the piston to define a combustion chamber; and*

*a belleville spring positioned between the cylinder head and the fireplate such that the spring is received by the annular groove of the cylinder head and the recess of the fireplate, so that when the cylinder head is threaded into the engine block, the spring is compressed between the cylinder head and the fireplate to provide a downward force against the top side of the fireplate to offset an upward force created by combustion within the combustion chamber, thereby substantially ensuring that the fireplate remains in contact with the gasket, and the gasket remains in contact with the shoulder of the sleeve, to provide an appropriate combustion seal during operation of the engine.*

*81. An internal combustion engine as set forth in claim 80, wherein the gasket is a copper gasket.*

*82. An internal combustion engine as set forth in claim 80, wherein the engine is a two-stroke, diesel aircraft engine.*

*83. An internal combustion engine according to claim 20, wherein the engine block at least partially defines a crankcase, the engine further comprising:*

*a crankshaft rotatably supported within said crankcase;*

*a piston reciprocally operable within said cylinder;*

*a connecting rod for operatively coupling said piston to said crankshaft, said connecting rod including a first end connected to said crankshaft and a second end which includes an arcuate portion;*

*a wrist pin pivotally connected to said piston, said wrist pin having an annular wall including a cylindrical outer surface engaging said arcuate portion of said connecting rod, and said annular wall including a cylindrical inner surface;*

*a wrist pin insert within said wrist pin; and*

*a plurality of fasteners extending through said annular wall of said wrist pin and securing said arcuate portion of said connecting rod to said wrist pin insert, thereby securing said connecting rod to said wrist pin.*

*84. An internal combustion engine according to claim 83, wherein said second end of said connecting rod does not completely encircle said wrist pin.*

*85. An internal combustion engine according to claim 83, wherein said second end of said connecting rod has an arcuate extent of less than 180°.*

*86. An internal combustion engine according to claim 83, wherein said plurality of fasteners are threaded into said wrist pin insert.*

*87. An internal combustion engine according to claim 83, wherein said wrist pin insert is cylindrical.*

*88. An internal combustion engine according to claim 83, wherein said engine is a two-stroke, diesel aircraft engine.*

*89. An internal combustion engine according to claim 83, wherein substantially an entire longitudinal portion of said outer surface of said wrist pin engages said piston.*

*90. An internal combustion engine according to claim 20, wherein the engine block is a V-type engine block at least partially defining a first cylinder bank and a second cylinder bank, a first cooling jacket adjacent said first cylinder bank, and a second cooling jacket adjacent said second cylinder bank, said engine block further defining a cross-feed cooling passageway which extends between said first cooling jacket and said second cooling jacket, the engine further comprising:*

*a first thermostat in communication with said first cooling jacket; and*

*a second thermostat in communication with said second cooling jacket;*

*said cross-feed cooling passageway providing cooling fluid flow between said cooling jackets at least in the event of failure of one of said thermostats.*

*91. An internal combustion engine according to claim 90, wherein said engine is a two-stroke, diesel aircraft engine.*

*92. An internal combustion engine according to claim 20, wherein said engine block includes female threads concentric with said cylinder, and wherein said cylinder head including male threads engaging said female threads on said engine block.*

*93. An internal combustion engine, comprising:*

*an engine block at least partially defining a cylinder;*

*a cylinder head mounted to the engine block;*

*a piston reciprocally operable within the cylinder;*

*a fireplate positioned between the cylinder head and the piston, the fireplate cooperating with the piston to define a combustion chamber; and*

*a head spring positioned between the cylinder head and the fireplate, such that the head spring provides a downward force against the fireplate to offset an upward force created by combustion within the combustion chamber.*

*94. An internal combustion engine as set forth in claim 93, wherein the cylinder head threads into a portion of the engine block.*

*95. An internal combustion engine as set forth in claim 93, wherein the cylinder head has an annular groove which receives the head spring.*

*96. An internal combustion engine as set forth in claim 95, wherein the fireplate has a recess which also receives the head spring.*

*97. An internal combustion engine as set forth in claim 93, wherein the cylinder includes a shoulder against which the head spring forces the fireplate.*

*98. An internal combustion engine as set forth in claim 97, further comprising a cylindrical sleeve positioned within the cylinder, wherein the piston reciprocally operates within the sleeve, and wherein the sleeve provides the shoulder.*

*99. An internal combustion engine as set forth in claim 98, further comprising a gasket positioned between the fireplate and the shoulder of the sleeve.*

*100. An internal combustion engine as set forth in claim 99, wherein the gasket is a copper gasket.*

*101. An internal combustion engine as set forth in claim 93, wherein the head spring is annular.*

*102. An internal combustion engine as set forth in claim 93, wherein the head spring is a belleville spring.*

*103. An internal combustion engine as set forth in claim 93, wherein the engine is a two-stroke, diesel aircraft engine.*

*104. An internal combustion engine according to claim 93, wherein the cylinder head cooperates with said cylinder and said piston to define a combustion chamber, the engine further comprising:*

*a fuel injection system including:*

*a fuel injector for injecting fuel into said combustion chamber, said fuel injector having a fuel inlet port, a fuel outlet port, a fuel passage communicating between said fuel inlet port and said fuel outlet port, a cooling fuel inlet port, a leak-off fuel outlet port, and a cooling fuel passage communicating between said cooling fuel inlet port and said leak-off fuel outlet port;*

*a fuel pump;*

*a fuel supply line communicating between said fuel pump and said fuel inlet port;*

*a bypass fuel line communicating between said fuel pump and said cooling fuel inlet port, such that overflow fuel from said fuel pump flows through said bypass fuel line, into said cooling fuel inlet port, through said cooling fuel passage and out of said leak-off fuel outlet port, thereby cooling said fuel injector, wherein the overflow fuel is recirculated from said leak-off fuel outlet port back to said fuel pump; and*

*a fuel filter placed upstream of said fuel pump such that the overflow fuel recirculated to said fuel pump flows through said fuel filter prior to reaching said fuel pump, and such that the overflow fuel which cools said fuel injector is warmed as it flows through said fuel injector, thereby heating the fuel which flows through said fuel filter to substantially prevent ice build-up on said fuel filter during cold weather.*

*105. An internal combustion engine as set forth in claim 104, wherein the cylinder head threads into a portion of the engine block.*

*106. An internal combustion engine as set forth in claim 104, wherein the cylinder head has an annular groove which receives the head spring.*

*107. An internal combustion engine as set forth in claim 106, wherein the fireplate has a recess which also receives the head spring.*

*108. An internal combustion engine as set forth in claim 104, wherein the cylinder includes a shoulder against which the head spring forces the fireplate.*

*109. An internal combustion engine as set forth in claim 108, further comprising a cylindrical sleeve positioned within the cylinder, wherein the piston reciprocally operates within the sleeve, and wherein the sleeve provides the shoulder.*

*110. An internal combustion engine as set forth in claim 109, further comprising a gasket positioned between the fireplate and the shoulder of the sleeve.*

*111. An internal combustion engine as set forth in claim 110, wherein the gasket is a copper gasket.*

*112. An internal combustion engine as set forth in claim 104, wherein the head spring is annular.*

*113. An internal combustion engine as set forth in claim 104, wherein the head spring is a belleville spring.*

*114. An internal combustion engine as set forth in claim 104, wherein the engine is a two-stroke, diesel aircraft engine.*

*115. An internal combustion engine, comprising:*

*an engine block at least partially defining a cylinder;*

*a cylindrical sleeve positioned within the cylinder, the sleeve including a shoulder;*

*a cylinder head threadably mounted to a portion of the engine block and on the cylinder, the cylinder head having an annular groove;*

*a piston reciprocally operable within the sleeve;*

*a gasket supported on the shoulder of the sleeve;*

*a fireplate positioned between the cylinder head and the gasket, the fireplate having a top side which includes a recess, and a bottom side which cooperates with the piston to define a combustion chamber; and*

*a belleville spring positioned between the cylinder head and the fireplate such that the spring is received by the annular groove of the cylinder head and the recess of the fireplate, so that when the cylinder head is threaded into the engine block, the spring is compressed between the cylinder head and the fireplate to provide a downward force against the top side of the fireplate to offset an upward force created by combustion within the combustion chamber, thereby substantially ensuring that the fireplate remains in contact with the gasket, and the gasket remains in contact with the shoulder of the sleeve, to provide an appropriate combustion seal during operation of the engine.*

*116. An internal combustion engine as set forth in claim 115, wherein the gasket is a copper gasket.*

*117. An internal combustion engine as set forth in claim 115, wherein the engine is a two-stroke, diesel aircraft engine.*

*118. An internal combustion engine according to claim 115, wherein the cylinder head cooperates with said cylinder and said piston to define a combustion chamber, the engine further comprising:*

*a fuel injection system including:*

*a fuel injector for injecting fuel into said combustion chamber, said fuel injector having a fuel inlet port, a fuel outlet port, a fuel passage communicating between said fuel inlet port and said fuel outlet port, a cooling fuel inlet port, a leak-off fuel outlet port, and a cooling fuel passage communicating between said cooling fuel inlet port and said leak-off fuel outlet port;*

*a fuel pump;*

*a fuel supply line communicating between said fuel pump and said fuel inlet port;*

*a bypass fuel line communicating between said fuel pump and said cooling fuel inlet port, such that overflow fuel from said fuel pump flows through said bypass fuel line, into said cooling fuel inlet port, through said cooling fuel passage and out of said leak-off fuel outlet port, thereby cooling said fuel injector, wherein the overflow fuel is recirculated from said leak-off fuel outlet port back to said fuel pump; and*

*a fuel filter placed upstream of said fuel pump such that the overflow fuel recirculated to said fuel pump flows through said fuel filter prior to reaching said fuel pump, and such that the overflow fuel which cools said fuel injector is warmed as it flows through said fuel injector, thereby heating the fuel which flows through said fuel filter to substantially prevent ice build-up on said fuel filter during cold weather.*

*119. An internal combustion engine as set forth in claim 118, wherein the gasket is a copper gasket.*

*120. An internal combustion engine as set forth in claim 118, wherein the engine is a two-stroke, diesel aircraft engine.*

*121. An internal combustion engine according to claim 115, wherein the cylinder head cooperates with said cylinder and said piston to define a combustion chamber, the engine further comprising:*

*a fuel injection system including:*

*a fuel injector for injecting fuel into said combustion chamber, said fuel injector including a fuel injector nut, and a fuel injector body threaded into said fuel injector nut so as to define with said fuel injector nut a space into which leak-off fuel normally flows, said fuel injector body having therein a fuel inlet port, a cooling fuel inlet port, a leak-off fuel outlet port, an upstream cooling fuel passage portion between said cooling fuel inlet port and said space, and a downstream cooling fuel passage portion between said space and said leak-off fuel outlet port, and said fuel injector also including a fuel outlet port, and a fuel passage communicating between said fuel inlet port and said fuel outlet port;*

*a fuel pump;*

*a fuel supply line communicating between said fuel pump and said fuel inlet port;*

*a bypass fuel line communicating between said fuel pump and said cooling fuel inlet port, such that overflow fuel from said fuel pump flows through said bypass fuel line, into said cooling fuel inlet port, through said upstream cooling fuel passage portion and into said space, where the overflow fuel commingles with leak-off fuel in said space, through said downstream cooling fuel passage portion and out of said leak-off fuel outlet port, thereby cooling said fuel injector; and*

*a fuel return line conducting the overflow fuel from said leak-off fuel outlet port back to said fuel pump.*

*122. An internal combustion engine as set forth in claim 121, wherein the gasket is a copper gasket.*

*123. An internal combustion engine as set forth in claim 121, wherein the engine is a two-stroke, diesel aircraft engine.*

*124. A method of assembling a cylinder head to an engine block of an internal combustion engine to create a combustion seal, the method comprising the acts of:*

*positioning a piston, which is reciprocally operable within a cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final*

*assembly position, such that threading the cylinder head into the engine block the second time compresses the head spring between the cylinder head and the fireplate so that the head spring provides a downward force against the fireplate to offset an upward force created by combustion within the combustion chamber.*

*125. A method as set forth in claim 124, further comprising the act of positioning a gasket on a shoulder of a sleeve positioned within the cylinder, the gasket being located between the shoulder of the sleeve and the fireplate, the piston being reciprocally operable within the sleeve, and the gasket being appropriately sized to obtain the predetermined combustion chamber volume.*

*126. A method as set forth in claim 125, wherein the gasket is a copper gasket.*

*127. A method as set forth in claim 124, wherein the head spring is a belleville spring.*

*128. A method as set forth in claim 124, wherein the engine is a two-stroke, diesel aircraft engine.*

*129. An internal combustion engine, comprising:*

*a V-type engine block at least partially defining a first cylinder bank and a second cylinder bank, a first cooling jacket adjacent said first cylinder bank, and a second cooling jacket adjacent said second cylinder bank, said engine block further defining a cross-feed cooling passageway which extends between said first cooling jacket and said second cooling jacket;*

*a first thermostat in communication with said first cooling jacket; and*

*a second thermostat in communication with said second cooling jacket;*

*said cross-feed cooling passageway configured to allow cooling fluid flow from one of said first and second cooling jackets to the other of said first and second cooling jackets through said cross-feed cooling passageway at least in the event of failure of one of said thermostats.*

*130. An internal combustion engine according to claim 129, wherein said engine is a two-stroke, diesel aircraft engine.*

*131. An internal combustion engine according to claim 129, wherein said cross-feed cooling passageway is drilled through a portion of said V-type engine block.*

*132. A method of assembling a cylinder head to an engine block of an internal combustion engine to create a combustion seal, the internal combustion engine including an engine block at least partially defining a cylinder, a cylinder head mounted on the cylinder, and a cooling cap mounted on the cylinder head, wherein at least one of the cylinder head and the cooling cap includes a substantially annular coolant groove such that the cooling cap and the cylinder head define a substantially annular cooling passageway, the cooling cap also including inlet and outlet ports communicating with the cooling passageway so that cooling fluid can flow into the inlet port, through the cooling passageway, and out of the outlet port, thereby cooling the cylinder head, the method comprising the acts of:*

*positioning a piston, which is reciprocally operable within the cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final assembly position, such that threading the cylinder head into the engine block the second time compresses the head spring between the cylinder head and the fireplate so that the head spring provides a downward force against the fireplate to offset an upward force created by combustion within the combustion chamber.*

*133. A method as set forth in claim 132 further comprising the act of positioning a gasket on a shoulder of a sleeve positioned within the cylinder, the gasket being located between the shoulder of the sleeve and the fireplate, the piston being reciprocally operable within the sleeve, and the gasket being appropriately sized to obtain the predetermined combustion chamber volume.*

*134. A method as set forth in claim 133, wherein the gasket is a copper gasket.*

*135. A method as set forth in claim 132, wherein the head spring is a belleville spring.*

*136. A method as set forth in claim 132, wherein the engine is a two-stroke, diesel aircraft engine.*

*137. A method of assembling a cylinder head to an engine block of an internal combustion engine to create a combustion seal, the internal combustion engine including an engine block at least partially defining a cylinder, a cylinder head mounted on the cylinder, and a cooling cap mounted on the cylinder head, wherein at least one of the cylinder head and the cooling cap has a coolant groove such that the cooling cap and the cylinder head define a cooling passageway, the cooling cap further having inlet and outlet ports communicating with the cooling passageway, such that cooling fluid flows into the inlet port, through the cooling passageway in a single direction, and out of the outlet port, thereby cooling the cylinder head, the method comprising the acts of:*

*positioning a piston, which is reciprocally operable within the cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final assembly position, such that threading the cylinder head into the engine block the second time compresses the head spring between the cylinder head and the fireplate so that the head spring provides a downward force against the fireplate to offset an upward force created by combustion within the combustion chamber.*

*138. A method as set forth in claim 137, further comprising the act of positioning a gasket on a shoulder of a sleeve positioned within the cylinder, the gasket being located between the shoulder of the sleeve and the fireplate, the piston being reciprocally operable within the sleeve, and the*

*gasket being appropriately sized to obtain the predetermined combustion chamber volume.*

*139. A method as set forth in claim 138, wherein the gasket is a copper gasket.*

*140. A method as set forth in claim 137, wherein the head spring is a belleville spring.*

*141. A method as set forth in claim 137, wherein the engine is a two-stroke, diesel aircraft engine.*

*142. A method of assembling a cylinder head to an engine block of an internal combustion engine to create a combustion seal, the internal combustion engine including an engine block at least partially defining a cylinder, a cylinder head mounted on the cylinder, a cooling cap mounted on the cylinder head, one of the cylinder head and the cooling cap having therein an annular coolant groove such that the cooling cap and the cylinder head define therebetween a cooling passageway, the cooling cap further having inlet and outlet ports communicating with the cooling passageway, and the other of the cylinder head and the cooling cap having there on a divider member that is positioned between the inlet and outlet ports and that extends into the coolant groove so as to substantially close the cooling passageway in one direction between the inlet and outlet ports of the cooling cap, thereby ensuring that the cooling fluid flows in an opposite direction around the cooling passageway, the method comprising the acts of:*

*positioning a piston, which is reciprocally operable within the cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final assembly position, such that threading the cylinder head into the engine block the second time compresses the head spring between the cylinder head and the fireplate so that the head spring provides a downward force against the fireplate to offset an upward force created by combustion within the combustion chamber.*

*143. A method as set forth in claim 142 further comprising the act of positioning a gasket on a shoulder of a sleeve positioned within the cylinder, the gasket being located between the shoulder of the sleeve and the fireplate, the piston being reciprocally operable within the sleeve, and the gasket being appropriately sized to obtain the predetermined combustion chamber volume.*

*144. A method as set forth in claim 143, wherein the gasket is a copper gasket.*

*145. A method as set forth in claim 142, wherein the head spring is a belleville spring.*

*146. A method as set forth in claim 142, wherein the engine is a two-stroke, diesel aircraft engine.*

*147. A method of assembling a cylinder head to an engine block of an internal combustion engine to create a combustion seal, the internal combustion engine including an engine block at least partially defining a cylinder, a piston reciprocally operable within said cylinder, a cylinder head cooperating with said cylinder and said piston to define a combustion chamber, and a fuel injection system including a fuel injector for injecting fuel into said combustion chamber, said fuel injector having a fuel inlet port, a fuel outlet port, a fuel passage communicating between said fuel inlet port and said fuel outlet port, a cooling fuel inlet port, a leak-of fuel outlet port, and a cooling fuel passage communicating between said cooling fuel inlet port and said leak-off fuel outlet port, a fuel pump, a fuel supply line communicating between said fuel pump and said fuel inlet port, a bypass fuel line communicating between said fuel pump and said cooling fuel inlet port, such that overflow fuel from said fuel pump flows through said bypass fuel line, into said cooling fuel inlet port, through said cooling fuel passage and out of said leak-off fuel outlet port, thereby cooling said fuel injector, wherein the overflow fuel is recirculated from said leak-off fuel outlet port back to said fuel pump, and a fuel filter placed upstream of said fuel pump such that the overflow fuel recirculated to said fuel pump flows through said fuel filter prior to reaching said fuel pump, and such that the overflow fuel which cools said fuel injector is warmed as it flows through said fuel injector, thereby heating the fuel which flows through said fuel filter to substantially prevent ice build-up on said fuel filter during cold weather, the method comprising the acts of:*

*positioning a piston, which is reciprocally operable within a cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final assembly position, such that threading the cylinder head into the engine block the second time compresses the head spring between the cylinder head and the fireplate so that the head spring provides a downward force against the fireplate to offset an upward force created by combustion within the combustion chamber.*

*148. A method as set forth in claim 147, further comprising the act of positioning a gasket on a shoulder of a sleeve positioned within the cylinder, the gasket being located between the shoulder of the sleeve and the fireplate, the piston being reciprocally operable within the sleeve, and the gasket being appropriately sized to obtain the predetermined combustion chamber volume.*

*149. A method as set forth in claim 148, wherein the gasket is a copper gasket.*

*150. A method as set forth in claim 147, wherein the head spring is a belleville spring.*

*151. A method as set forth in claim 147, wherein the engine is a two-stroke, diesel aircraft engine.*

*152. An internal combustion engine according to claim 93, wherein the cylinder head cooperates with said cylinder and said piston to define a combustion chamber, the engine further comprising:*

*a fuel injection system including:*

*a fuel injector for injecting fuel into said combustion chamber, said fuel injector including a fuel injector nut,*

*and a fuel injector body threaded into said fuel injector nut so as to define within said fuel injector nut a space into which leak-off fuel normally flows, said fuel injector body having therein a fuel inlet port, a cooling fuel inlet port, a leak-off fuel outlet port, an upstream cooling fuel passage portion between said cooling fuel inlet port and said space, and a downstream cooling fuel passage portion between said space and said leak-off fuel outlet port, and said fuel injector also including a fuel outlet port, and a fuel passage communicating between said fuel inlet port and said fuel outlet port;*

*a fuel pump;*

*a fuel supply line communicating between said fuel pump and said fuel inlet port;*

*a bypass fuel line communicating between said fuel pump and said cooling fuel inlet port, such that overflow fuel from said fuel pump flows through said bypass fuel line, into said cooling fuel inlet port, through said upstream cooling fuel passage portion and into said space, where the overflow fuel commingles with leak-off fuel in said space, through said downstream cooling fuel passage portion and out of said leak-off fuel outlet port, thereby cooling said fuel injector; and*

*a fuel return line conducting the overflow fuel from said leak-off fuel outlet port back to said fuel pump.*

*153. An internal combustion engine as set forth in claim 152, wherein the cylinder head threads into a portion of the engine block.*

*154. An internal combustion engine as set forth in claim 152, wherein the cylinder head has an annular groove which receives the head spring.*

*155. An internal combustion engine as set forth in claim 154, wherein the fireplate has a recess which also receives the head spring.*

*156. An internal combustion engine as set forth in claim 152, wherein the cylinder includes a shoulder against which the head spring forces the fireplate.*

*157. An internal combustion engine as set forth in claim 156, further comprising a cylindrical sleeve positioned within the cylinder, wherein the piston reciprocally operates within the sleeve, and wherein the sleeve provides the shoulder.*

*158. An internal combustion engine as set forth in claim 157, further comprising a gasket positioned between the fireplate and the shoulder of the sleeve.*

*159. An internal combustion engine as set forth in claim 158, wherein the gasket is a copper gasket.*

*160. An internal combustion engine as set forth in claim 152, wherein the head spring is annular.*

*161. An internal combustion engine as set forth in claim 152, wherein the head spring is a belleville spring.*

*162. An internal combustion engine as set forth in claim 152, wherein the engine is a two-stroke, diesel aircraft engine.*

*163. A method of assembling a cylinder head to an engine block of an internal combustion engine to create a combustion seal, the internal combustion engine including an engine block at least partially defining a cylinder, a piston reciprocally operable within said cylinder, a cylinder head cooperating with said cylinder and said piston to define a combustion chamber, and a fuel injection system including, a fuel injector for injecting fuel into said combustion chamber, said fuel injector including a fuel injector nut, and a fuel injector body threaded into said fuel injector nut so as to define within said fuel injector nut a space into which leak-off fuel normally flows, said fuel injector body having therein a fuel inlet port, a cooling fuel inlet port, a leak-off fuel outlet port, an upstream cooling fuel passage portion between said cooling fuel inlet port and said space, and a downstream cooling fuel passage portion between said space and said leak-off fuel outlet port, and said fuel injector also including a fuel outlet port, and a fuel passage communicating between said fuel inlet port and said fuel outlet port, a fuel pump, a fuel supply line communicating between said fuel pump and said fuel inlet port, a bypass fuel line communicating between said fuel pump and said cooling fuel inlet port, such that overflow fuel from said fuel pump flows through said bypass fuel line, into said cooling fuel inlet port, through said upstream cooling fuel passage portion and into said space, where the overflow fuel commingles with leak-off fuel in said space, through said downstream cooling fuel passage portion and out of said leak-off fuel outlet port, thereby cooling said fuel injector, and a fuel return line conducting the overflow fuel from said leak-off fuel outlet port back to said fuel pump, the method comprising the acts of:*

*positioning a piston, which is reciprocally operable within the cylinder of the engine, in its top dead center position;*

*positioning a fireplate within the cylinder above the piston to create a predetermined combustion chamber volume between the fireplate and the piston;*

*threading the cylinder head into the engine block until the cylinder head contacts the fireplate, thereby defining a final assembly position for the cylinder head with respect to the engine block;*

*marking the final assembly position of the cylinder head;*

*unthreading the cylinder head from the engine block;*

*positioning a head spring between the cylinder head and the fireplate; and*

*threading the cylinder head into the engine block a second time until the cylinder head is located in the final assembly position, such that threading the cylinder head into the engine block the second time compresses the head spring between the cylinder head and the fireplate so that the head spring provides a downward force against the fireplate to offset an upward force created by combustion within the combustion chamber.*

*164. A method as set forth in claim 163, further comprising the act of positioning a gasket on a shoulder of a sleeve positioned within the cylinder, the gasket being located between the shoulder of the sleeve and the fireplate, the piston being reciprocally operable within the sleeve, and the gasket being appropriately sized to obtain the predetermined combustion chamber volume.*

*165. A method as set forth in claim 164, wherein the gasket is a copper gasket.*

*166. A method as set forth in claim 163, wherein the head spring is a belleville spring.*

*167. A method as set forth in claim 163, wherein the engine is a two-stroke, diesel aircraft engine.*

* * * * *

UNITED STATES PATENT AND TRADEMARK OFFICE

CERTIFICATE OF CORRECTION

PATENT NO. : RE 40,500 E
APPLICATION NO. : 11/498913
DATED : August 3, 2006
INVENTOR(S) : Douglas A. Doers and Dean P. Bergman It is certified that error appears in the above-identified patent and that said Letters Patent is hereby corrected as shown below:

On the Title page item (63), add --Continuation-in-part of application No. 09/663,838, filed September 15, 2000, U.S. Patent No. 6,622,667--

On the Title page item (56), delete duplication, "WO 02/08591 1/2002"

Column 1, lines 10-15, should read --This application is a reissue of U.S. Application No. 10/350,748, filed Jan. 24, 2003, U.S. Patent No. 6,769,383, which is a continuation-in-part of PCT Application No. PCT/US01/20832, filed Jun. 29, 2001, which claims priority to U.S. Application No. 09/663,838, filed Sep. 15, 2000, U.S. Patent No. 6,622,667, Sep. 23, 2003, and U.S. Application No. 60/220,787, filed Jul. 25, 2000. The entire contents of these applications are hereby incorporated by reference.--

Claim 92, column 19, line 40: "includes" should read --including--

Signed and Sealed this

Third Day of March, 2009

John Doll

JOHN DOLL
*Acting Director of the United States Patent and Trademark Office*

UNITED STATES PATENT AND TRADEMARK OFFICE

CERTIFICATE OF CORRECTION

PATENT NO. : RE 40,500 E
APPLICATION NO. : 11/498913
DATED : September 16, 2008
INVENTOR(S) : Douglas A. Doers and Dean P. Bergman It is certified that error appears in the above-identified patent and that said Letters Patent is hereby corrected as shown below:

On the Title page item (63), add --Continuation-in-part of application No. 09/663,838, filed September 15, 2000, U.S. Patent No. 6,622,667--

On the Title page item (56), delete duplication, "WO 02/08591 1/2002"

Column 1, lines 10-15, should read --This application is a reissue of U.S. Application No. 10/350,748, filed Jan. 24, 2003, U.S. Patent No. 6,769,383, which is a continuation-in-part of PCT Application No. PCT/US01/20832, filed Jun. 29, 2001, which claims priority to U.S. Application No. 09/663,838, filed Sep. 15, 2000, U.S. Patent No. 6,622,667, Sep. 23, 2003, and U.S. Application No. 60/220,787, filed Jul. 25, 2000. The entire contents of these applications are hereby incorporated by reference.--

Claim 92, column 19, line 40: "includes" should read --including--

This certificate supersedes the Certificate of Correction issued March 3, 2009.

Signed and Sealed this

Thirty-first Day of March, 2009

John Doll

JOHN DOLL
*Acting Director of the United States Patent and Trademark Office*